(12) United States Patent
Oh et al.

(10) Patent No.: US 12,094,492 B2
(45) Date of Patent: Sep. 17, 2024

(54) ELECTRONIC DEVICE, AND METHOD OF SYNCHRONIZING VIDEO DATA AND AUDIO DATA BY USING SAME

(71) Applicant: SAMSUNG ELECTRONICS CO., LTD., Suwon-si (KR)

(72) Inventors: Hyomin Oh, Suwon-si (KR); Misun Kim, Suwon-si (KR); Taeyoung Han, Suwon-si (KR); Sangheon Kim, Suwon-si (KR); Mira Seo, Suwon-si (KR); Yongju Son, Suwon-si (KR); Kwangyong Choi, Suwon-si (KR); Yeunwook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 63 days.

(21) Appl. No.: 18/099,093

(22) Filed: Jan. 19, 2023

(65) Prior Publication Data

US 2023/0154500 A1    May 18, 2023

Related U.S. Application Data

(63) Continuation of application No. PCT/KR2021/010038, filed on Aug. 2, 2021.

(30) Foreign Application Priority Data

Aug. 3, 2020    (KR) .................. 10-2020-0096894

(51) Int. Cl.
*G11B 27/10*        (2006.01)
*G06F 3/16*         (2006.01)
(Continued)

(52) U.S. Cl.
CPC .............. *G11B 27/10* (2013.01); *G06F 3/165* (2013.01); *H04R 1/028* (2013.01); *H04R 1/406* (2013.01); *H04R 3/005* (2013.01); *H04R 2499/11* (2013.01)

(58) Field of Classification Search
None
See application file for complete search history.

(56) References Cited

U.S. PATENT DOCUMENTS

| 5,130,812 | A  | * | 7/1992 | Yamaoka | ............. | G11B 27/029 386/326 |
| 10,297,245 | B1 | * | 5/2019 | Chen    | ................ | G10K 11/17853 |

(Continued)

FOREIGN PATENT DOCUMENTS

CN    107018465 A  *  8/2017  ....... G11B 20/10527

*Primary Examiner* — Hung Q Dang
(74) *Attorney, Agent, or Firm* — Nixon & Vanderhye P.C.

(57) ABSTRACT

An electronic device may include a camera and a processor operatively connected to the camera, wherein the processor may be configured to: acquire video data through the camera; receive first audio data through a first audio input device; perform a connection configuration of a second audio input device as the device receiving audio data is switched from the first audio input device to the second audio input device; calculate a gap time on the basis of a time consumed for completing the connection configuration of the second audio input device; generate silent data on the basis of the calculated gap time; receive second audio data from the second audio input device; and synchronize the video data, the first audio data, the silent data, and the second audio data. Various other embodiments are possible.

15 Claims, 13 Drawing Sheets

(51) Int. Cl.
*G11B 27/031* (2006.01)
*H04N 21/422* (2011.01)
*H04N 21/43* (2011.01)
*H04N 21/439* (2011.01)
*H04N 21/81* (2011.01)
*H04N 21/8547* (2011.01)
*H04R 1/02* (2006.01)
*H04R 1/40* (2006.01)
*H04R 3/00* (2006.01)

(56) References Cited

U.S. PATENT DOCUMENTS

2005/0094965 A1* 5/2005 Chen .................... H04N 19/132
　　　　　　　　　　　　　　　　　　　　　386/278
2008/0002948 A1* 1/2008 Murata .................. H04S 1/005
　　　　　　　　　　　　　　　　　　　　　386/338
2017/0308351 A1* 10/2017 Laaksonen ............... H04R 1/00

* cited by examiner

ELECTRONIC DEVICE, AND METHOD OF SYNCHRONIZING VIDEO DATA AND AUDIO DATA BY USING SAME

CROSS-REFERENCE TO RELATED APPLICATIONS

This application is a continuation of International Application No. PCT/KR2021/010038 filed on Aug. 2, 2021, designating the United States, in the Korean Intellectual Property Receiving Office, and claiming priority to KR 10-2020-0096894 filed on Aug. 3, 2020, the disclosures of which are all hereby incorporated by reference herein in their entireties.

BACKGROUND

Field

Various example embodiments relate to an electronic device and/or a method for synchronizing video data and audio data using the same.

Description of Related Art

An electronic device may provide a function of capturing a video, and may start capturing a video according to an input for video capture. The electronic device may separately obtain video data and audio data at the time of video capture. The electronic device may synchronize video data and audio data, which are separately obtained, through video encoding, and may generate a video file in a form that can be used by the user.

SUMMARY

While the electronic device obtains video data through a camera and receives audio data through a microphone of the electronic device at the time of video capture, when an external microphone is connected, it may continuously receive audio data through the microphone of the electronic device other than the external microphone. As audio data is received through the microphone of the electronic device even though the external microphone is connected, audio data quality may deteriorate.

While the electronic device obtains video data through a camera and receives audio data through an external microphone communication-connected to the electronic device at the time of video capture, the connection of the external microphone may be released. As the external microphone is disconnected, audio data may be not received in a process of switching the microphone for receiving audio data from the external microphone to the microphone of the electronic device. As audio data is not received, synchronization between video data and audio data may be not matched as a result of encoding.

According to various example embodiments, when switching of the audio input device is detected during video capture, the electronic device may generate additional data according to the switching of the audio input device so that the video data obtained through the camera, the audio data input through the audio input device before switching, and the audio data input through the audio input device after switching are synchronized.

According to various example embodiments, an electronic device may include: a camera; and a processor operably connected, directly or indirectly, to the camera, and wherein the processor may be configured to: obtain video data via at least the camera; receive first audio data via at least a first audio input device; configure, in case that a device for receiving audio data is switched from the first audio input device to a second audio input device, a connection of the second audio input device; calculate a gap time based on a time required to complete connection configuration of the second audio input device; generate mute data based on the calculated gap time; receive second audio data from the second audio input device; and synchronize the video data, the first audio data, the mute data, and the second audio data.

According to various example embodiments, a method for an electronic device to synchronize video data and audio data may include: obtaining video data through a camera; receiving first audio data through a first audio input device (e.g., including microphone); configuring, in case that a device for receiving audio data is switched from the first audio input device to a second audio input device (e.g., including a microphone), a connection of the second audio input device; calculating a gap time based on a time required to complete the connection configuration of the second audio input device; generating mute data based on the calculated gap time; receiving second audio data from the second audio input device; and synchronizing the video data, the first audio data, the mute data, and the second audio data.

According to various example embodiments, when switching of the audio input device is detected during video capture, the electronic device may synchronize video data obtained from the camera, audio data received through the audio input device before switching, mute data generated based on the gap time, and audio data received through the audio input device after switching. The electronic device can synchronize the video data and the audio data by inserting the generated mute data in a section where audio data is not received in the process of configuring the after-switching audio input device as a device for receiving audio data.

According to various example embodiments, the electronic device may receive audio data through the before-switching audio input device for at least some of the time of the process for configuring the after-switching audio input device as a device for receiving audio data. Accordingly, it is possible to reduce audio data lost in the process of switching the audio input device.

BRIEF DESCRIPTION OF DRAWINGS

The above and other aspects, features, and advantages of certain example embodiments will be more apparent from the following detailed description, taken in conjunction with the accompanying drawings, in which.

DETAILED DESCRIPTION

Figure 1:
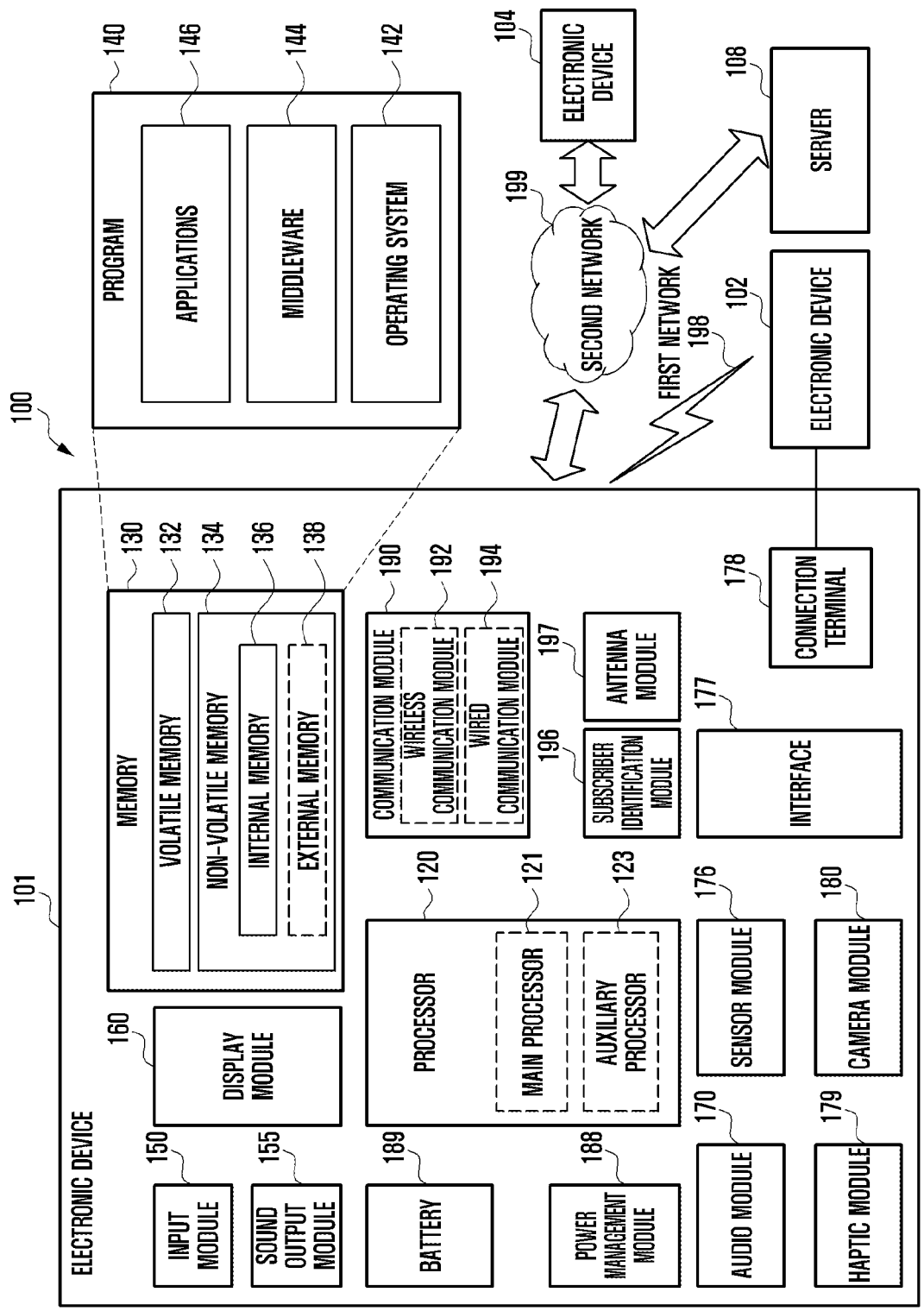
FIG. 1 is a block diagram of an electronic device in a network environment according to various example embodiments.

FIG. 1 is a block diagram illustrating an electronic device 101 in a network environment 100 according to various embodiments.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
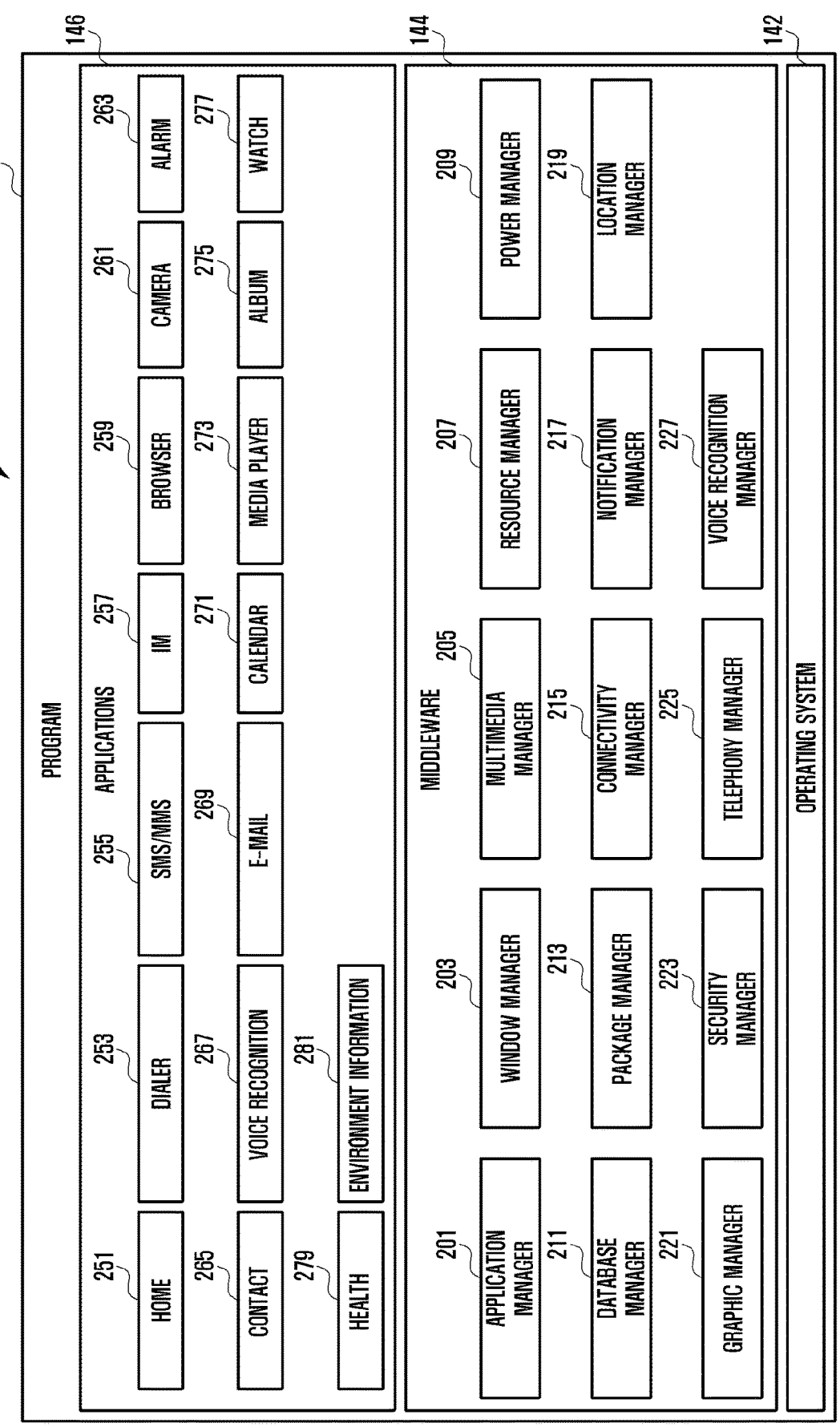
FIG. 2 is a block diagram illustrating programs according to various example embodiments.

FIG. 2 is a block diagram 200 illustrating the program 140 according to various embodiments.

According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bath™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input module 150, the sound output module 155, the display module 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display module or a camera module of the external electronic device). The device management application, additionally or alternatively, may support installation, delete, or update of an application running on the external electronic device.

Figure 3:
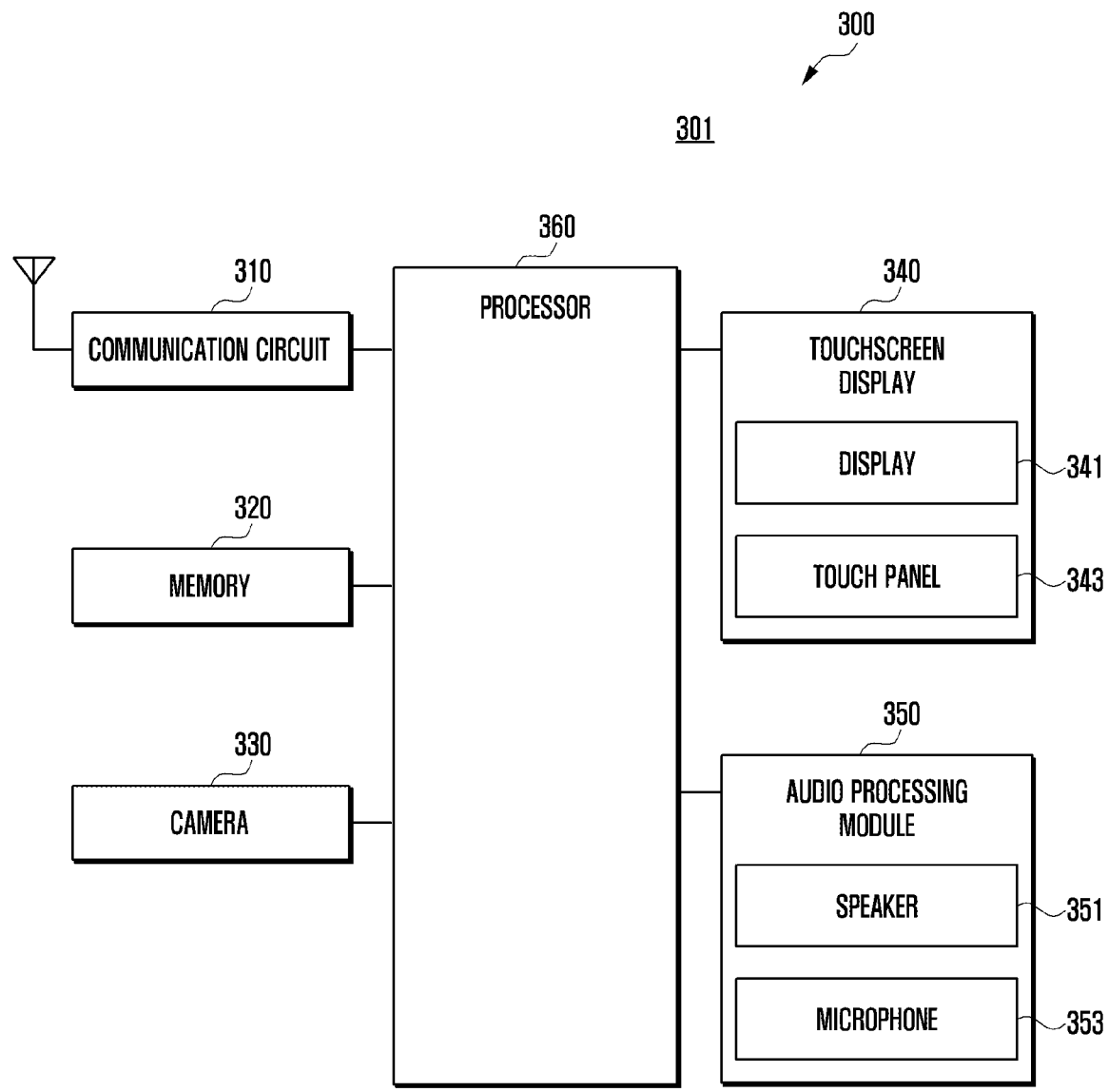
FIG. 3 is a diagram illustrating an electronic device according to various example embodiments.

FIG. 3 is a diagram 300 illustrating an electronic device 301 according to various embodiments.

With reference to FIG. 3, the electronic device 301 (e.g., electronic device 101 in FIG. 1) may include a communication circuit 310 (e.g., communication module 190 in FIG. 1, comprising communication circuitry), a memory 320 (e.g., memory 130 in FIG. 1), a camera 330 (e.g., camera module 180 in FIG. 1, comprising at least one camera), a touchscreen display 340 (e.g., display module 160 in FIG. 1), an audio processing module 350 (e.g., audio module 170 in FIG. 1), and a processor 360 (e.g., processor 120 in FIG. 1, comprising processing circuitry).

According to various example embodiments, the communication circuit 310 (e.g., communication module 190 in FIG. 1) may establish a communication channel with an external electronic device (e.g., electronic device 102 or electronic device 104 in FIG. 1) and may support transmitting and receiving various data to and from the external electronic device.

According to an embodiment, the communication circuit 310 may include a short-range wireless communication circuit such as Bluetooth, Bluetooth low energy (BLE), wireless fidelity (Wi-Fi) direct, ultra-wideband (UWB), and/or infrared data association (IrDA).

According to various example embodiments, the memory 320 (e.g., memory 130 in FIG. 1) may store video data obtained through the camera 330. The video data may include a plurality of video data frames. The memory 320 may store plural video data frames and information about the time (e.g., timestamp information) at which each of the plural video data frames is obtained. The memory 320 may store audio data received from the microphone 353. The audio data may include a plurality of audio data frames. The memory 320 may store plural audio data frames and information about the time (e.g., timestamp information) at which each of the plural audio data frames is obtained.

In an embodiment, the memory 320 may store a program that configures a connection of the switched device when the device for receiving audio data is switched during video capture. The memory 320 may store a program that calculates a gap time based on the time when the connection configuration of the switched device is completed and generates mute data based thereon. The memory 320 may store a program that synchronizes video data, audio data, and mute data based on time information (e.g., timestamp information).

According to various example embodiments, the camera 330 (e.g., camera module 180 in FIG. 1) may transmit a video collected during video capture as a preview image to the display 341 so that the user can check the video obtained through the camera 330.

According to various example embodiments, the touchscreen display 340 (e.g., display module 160 in FIG. 1, comprising a display) may be integrally formed to include the display 341 and the touch panel 343.

In an embodiment, the touchscreen display 340 may display a video under the control of the processor 360, and may be implemented with at least one of liquid crystal display (LCD), light-emitting diode (LED) display, organic light-emitting diode (OLED) display, micro-electro-mechanical systems (MEMS) display, or electronic paper display. However, it is not limited thereto.

In an embodiment, the touchscreen display 340 may display video data obtained from the camera 330. The touchscreen display 340 may display a notification window for notifying that the device has been switched when the device for receiving audio data is switched during video capture.

According to various example embodiments, the audio processing module 350 (e.g., audio module 170 in FIG. 1) may include a speaker 351 and a microphone 353. The audio processing module 350, comprising circuitry, may output audio data through the speaker 351. The audio processing module 350 may collect various audio data (e.g., user's voice) from the outside through the microphone 353.

According to various example embodiments, the processor 360 (e.g., processor 120 in FIG. 1) may control the overall operation of the electronic device 301 and signal flows between internal components of the electronic device 301, and may perform data processing.

In an embodiment, the processor 360 may obtain video data through the camera 330. The processor 360 may receive first audio data through a first audio input device. For example, the first audio input device may include at least one microphone 353 included in the electronic device 301, or may include an audio device including at least one microphone (e.g., wireless earphones (or, headphones, wireless microphone), external microphone) and connected through the communication circuit 310 or a connector (not shown) (e.g., connection terminal 178 in FIG. 1) of the electronic device 301. When the device for receiving audio data is switched from the first audio input device to a second audio input device, the processor 360 may configure the connection of the second audio input device. The processor 360 may calculate a gap time based on the time required for completing the connection configuration of the second audio input device. The processor 360 may generate mute data based on the calculated gap time. The processor 360 may receive second audio data from the second audio input device for which the connection configuration has been completed, and may synchronize the video data, the first audio data, the mute data, and the second audio data.

According to various embodiments, the electronic device 301 may include a camera 330 and a processor 360 operably connected, directly or indirectly, to the camera 330, and wherein the processor 360 may be configured to obtain video data through the camera 330, receive first audio data through a first audio input device, configure, when the device for receiving audio data is switched from the first audio input device to a second audio input device, the connection of the second audio input device, calculate a gap time based on the time required for completing the connection configuration of the second audio input device, generate mute data based on the calculated gap time, receive second audio data from the second audio input device, and synchronize the video data, the first audio data, the mute data, and the second audio data.

According to various embodiments, the electronic device 301 may further include a communication circuit 310 and a connector 178 comprising circuitry, the first audio input device may include at least one microphone 353 included in the electronic device 301, and the second audio input device may include an audio device having at least one microphone and connected through the communication circuit 310 or the connector 178.

According to various embodiments, the processor 360 may be configured to receive the first audio data through the first audio input device for at least some of the time of the connection configuration of the second audio input device.

According to various embodiments, when the first audio data is not received through the first audio input device, the processor 360 may be configured to calculate the gap time based on the time taken to complete the connection configuration of the second audio input device from a point in time when the second audio data is not received.

According to various embodiments, the processor 360 may be configured to block the first audio input device in response to completing the connection configuration of the second audio input device.

According to various embodiments, the electronic device 301 may further include a communication circuit 310 and a connector 178, the first audio input device may include an external microphone connected through the communication circuit 310 and/or the connector 178, and the second audio input device may include at least one microphone 353 included in the electronic device 301.

According to various embodiments, the processor 360 may be configured to determine size information and timestamp information of the mute data to be generated based on the calculated gap time.

According to various embodiments, the video data may be set to include plural video frames, the first audio data and the second audio data may each be set to include plural audio data frames, and the plural video frames, the mute data, and the plural audio data frames may each be set to have timestamp information.

According to various embodiments, the processor 360 may be configured to synchronize the plural video frames, the mute data, and the plural audio data frames on the basis of the timestamp.

According to various embodiments, the mute data may include audio data of a frequency range that a user cannot perceive.

Figure 4:
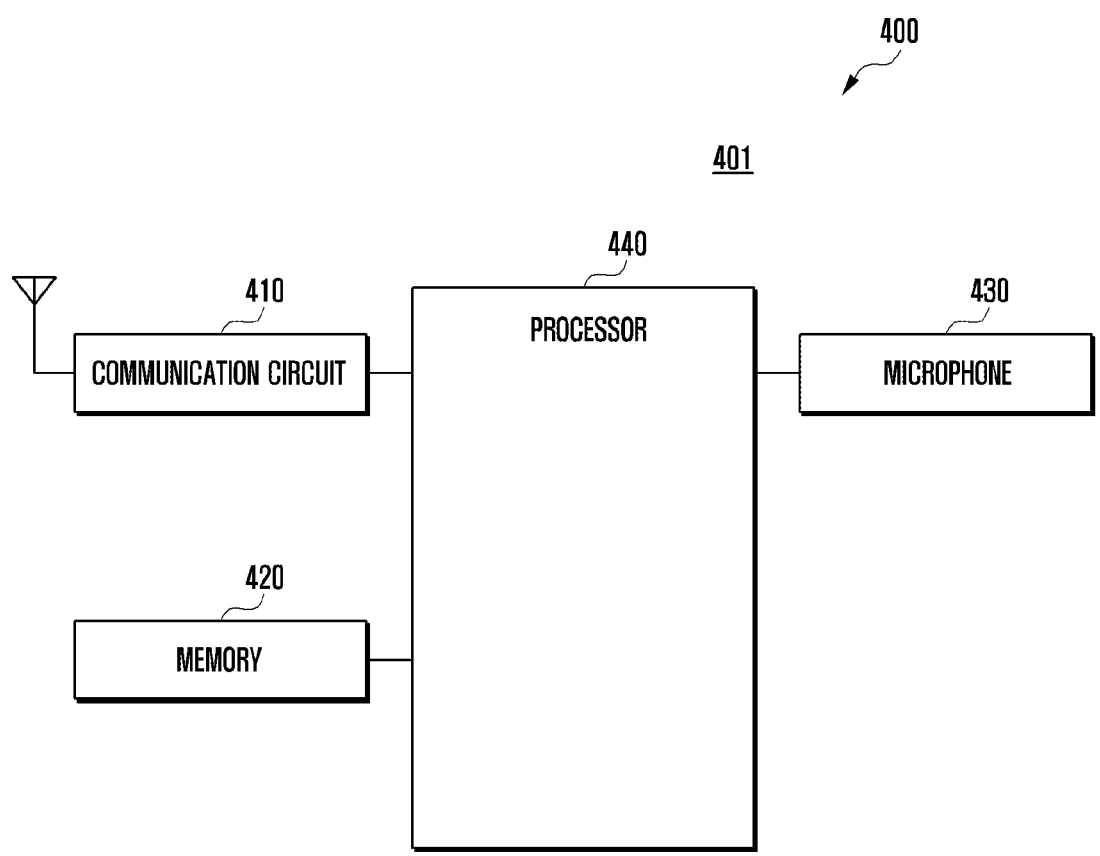
FIG. 4 is a diagram illustrating an external electronic device according to various example embodiments.

FIG. 4 is a diagram 400 illustrating an external electronic device 401 according to various embodiments.

With reference to FIG. 4, the external electronic device 401 may include a communication circuit 410, a memory 420, a microphone 430, and a processor 440.

In an embodiment, the external electronic device 401 may include a wireless earphone (or headphone) having at least one audio input device (e.g., at least one microphone) and/or an external microphone (e.g., wireless microphone).

According to various example embodiments, the communication circuit 410 may establish a communication channel with the electronic device 301 and may support transmitting and receiving various data to and from the electronic device 301. For example, the communication circuit 410 may include a short-range wireless communication circuit such as Bluetooth, Bluetooth low energy (BLE), wireless fidelity (Wi-Fi) direct, ultra-wideband (UWB), and/or infrared data association (IrDA).

According to various example embodiments, the memory 420 may store a program that transmits information about the external electronic device 401 to the electronic device 301 when the electronic device 301 is connected through the communication circuit 410, or when a connector (not shown) of the external electronic device 401 is connected to the electronic device 301 through a connector (not shown) of the electronic device 301.

According to various example embodiments, the microphone 430 may collect various audio data (e.g., user's voice) from the outside.

According to various example embodiments, when connected to the electronic device 301 through the communication circuit 410, or when a connector (not shown) of the external electronic device 401 is connected to the electronic device 301 through a connector (not shown) of the electronic device 301, the processor 440 may obtain audio data through the microphone 430. The processor 440 may transmit the obtained audio data to the electronic device 301.

Figure 5:
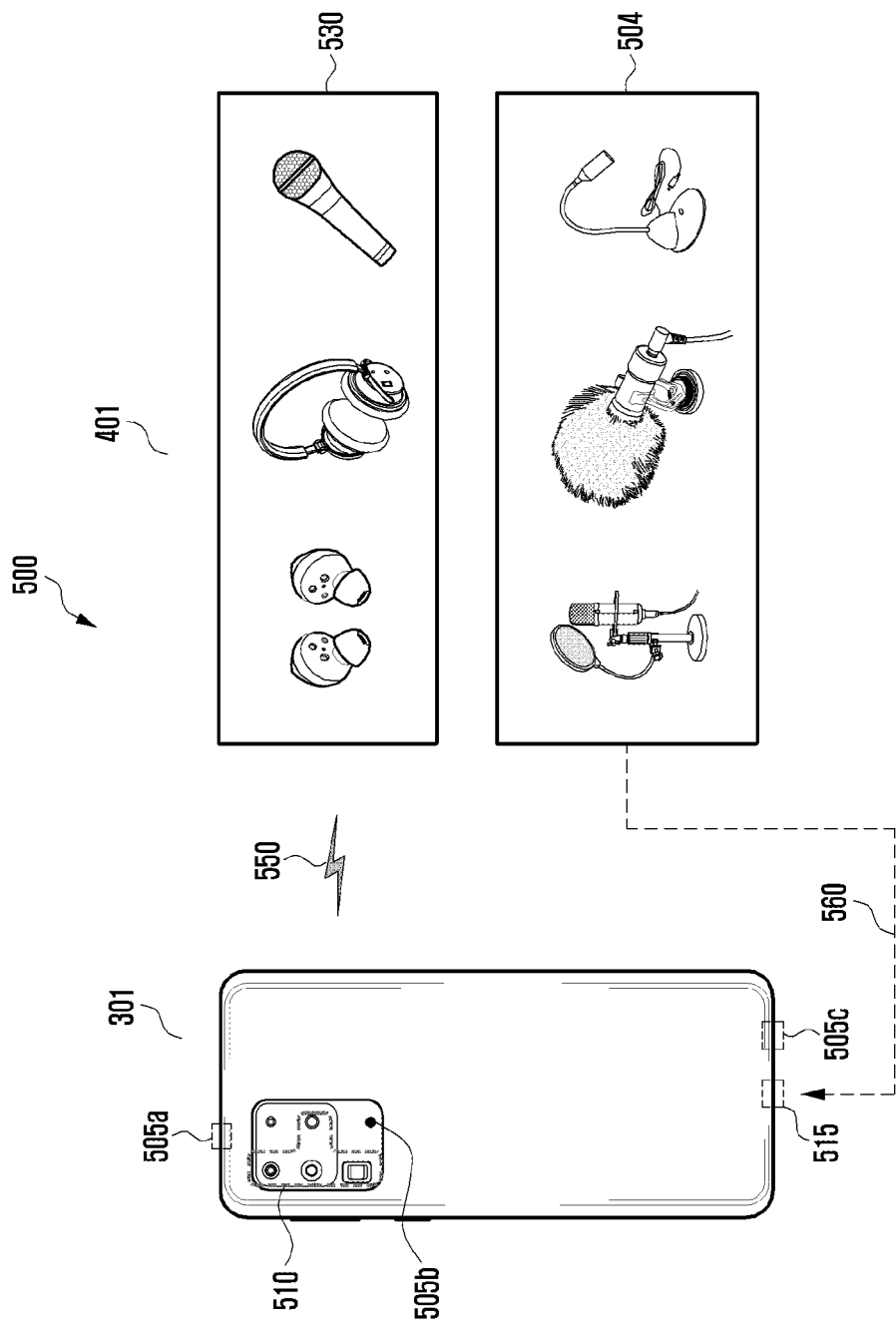
FIG. 5 is a diagram depicting a communication connection between the electronic device and the external electronic device according to various example embodiments.

FIG. 5 is a diagram 500 depicting a communication connection between the electronic device 301 and the external electronic device 401 according to various embodiments.

With reference to FIG. 5, the electronic device (e.g., electronic device 301 in FIG. 3) may include an audio input device (e.g., first microphone 505a, second microphone 505b, and/or third microphone 505c) (e.g., microphone 353 in FIG. 3), a camera 510 (e.g., camera 330 in FIG. 3), and/or a connector 515 comprising circuitry (e.g., connection terminal 178 in FIG. 1).

In an embodiment, the audio input device such as the first microphone 505a may be provided at the upper end of the electronic device 301, the second microphone 505b may be provided on the back of the electronic device 301, and the third microphone 505c may be provided at the lower end of the electronic device 301. The first microphone 505a, the second microphone 505b, and/or the third microphone 505c may collect various audio data (e.g., user's voice) generated from the outside of the electronic device 301.

According to various embodiments, the number of microphones included in the electronic device 301, the positions at which microphones are disposed, and/or the arrangement of microphones are not limited to those of FIG. 5.

In an embodiment, the camera 510 may transmit a collected video as a preview screen to the display (e.g., display 341 in FIG. 3), so that the user may check the video collected through the camera 510. In response to an input for video capture, the camera 510 may generate video data by capturing a video collected at a time point when the input for video capture is generated.

In an embodiment, the connector 515 may include a connector through which the electronic device 301 may be physically connected to the external electronic device 401. For example, the connector 515 may include a universal serial bus (USB) connector or an audio connector (e.g., headphone connector). However, it is not limited thereto.

In an embodiment, the external electronic device 401 may include at least one audio input device, for example, a wireless earphone (or, wireless headphone or wireless microphone) 530 having at least one microphone and/or an external microphone 504.

In an embodiment, the wireless earphone (or, wireless headphone or wireless microphone) 530 having at least one microphone may be connected to the electronic device 301 for communication through first communication 550 (e.g., short-range wireless communication circuit such as Bluetooth, wireless fidelity (Wi-Fi) direct, or infrared data association (IrDA)) (e.g., first network 198 in FIG. 1).

In an embodiment, the external microphone 504 may be connected, directly or indirectly, to the electronic device 301 through second communication 560 (e.g., wired communication). For example, the external microphone 504 may include a connector (not shown). The connector of the external microphone 504 may be inserted into the connector 515 of the electronic device 301. The connector (not shown) of the external microphone 504 may be received through a hole of the electronic device 301 to be in physical contact with the connector 515 of the electronic device 301. Through physical contact, the electronic device 301 and the external microphone 504 may be electrically connected.

Figure 6:
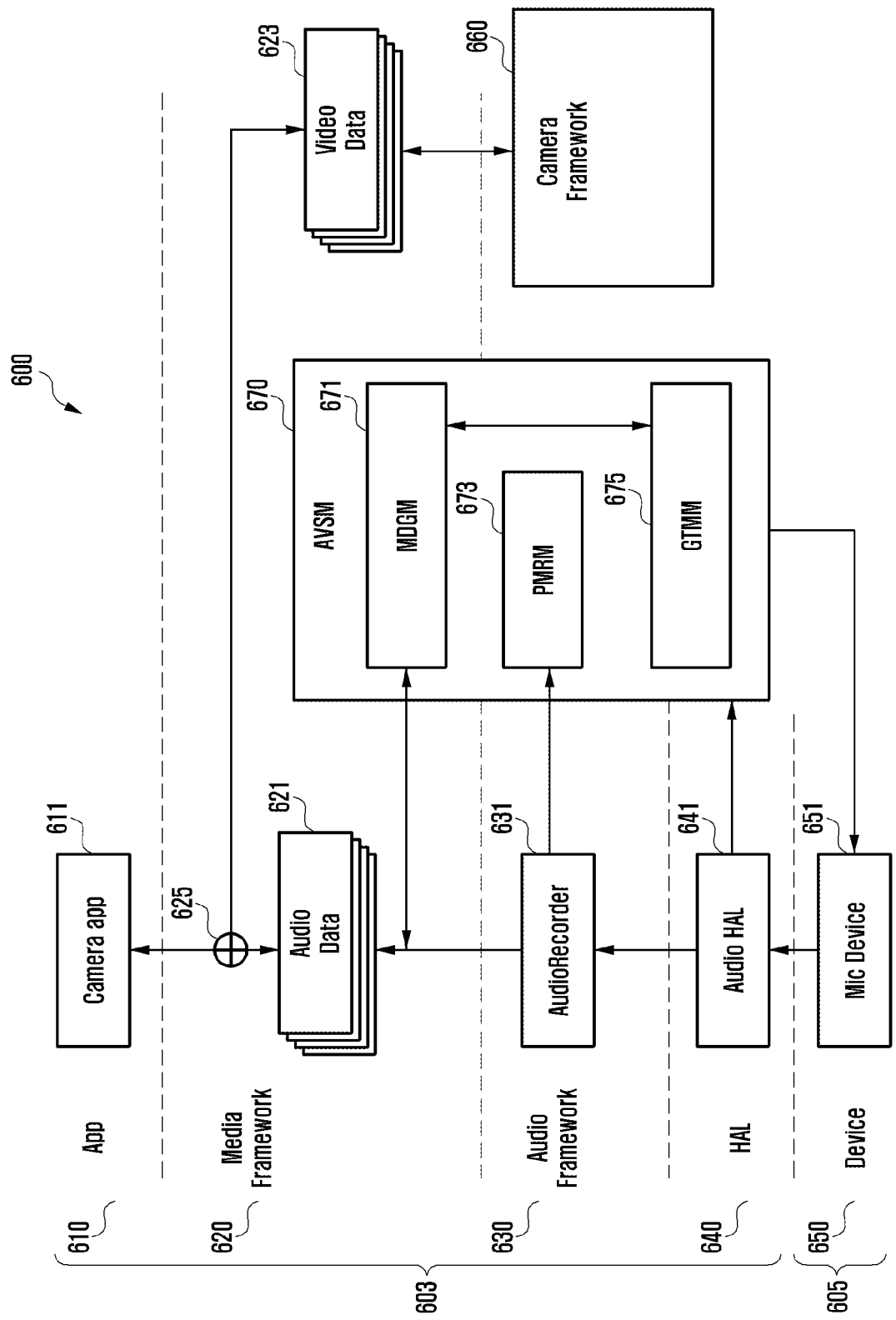
FIG. 6 is a diagram illustrating a hierarchical structure of the electronic device according to various example embodiments.

FIG. 6 is a diagram 600 illustrating a hierarchical structure of the electronic device 301 according to various embodiments.

With reference to FIG. 6, the electronic device (e.g., electronic device 301 in FIG. 3) may include software 603 and hardware 605.

In an embodiment, the software 603 (e.g., programs 140 in FIG. 1) may be loaded from a non-volatile memory (e.g., non-volatile memory 134 in FIG. 1) into a volatile memory (e.g., volatile memory 132 in FIG. 1), and may be executed by the processor (e.g., processor 360 in FIG. 3). The software 603 may include an application layer 610, a media framework 620, an audio framework 630, a hardware abstraction layer (HAL) 640, a camera framework 660, and an audio and video synchronization manager 670.

In an embodiment, the hardware 605 may include a device layer 650. For example, the device layer 650 may include a microphone device 651 (e.g., microphone 353 in FIG. 3).

In an embodiment, the application layer 610 (e.g., application 146 in FIG. 2) may include at least one application executable by the processor 360 and a system user interface (UI) (not shown). The at least one application may include an Internet browser, a video application, a camera application, or a game application. However, it is not limited thereto.

In an embodiment, the system UI (not shown) may include applications that constitute various graphical user interface (GUI) screens implemented on the system of the electronic device 301, such as a notification bar or a quick view.

In the following description, the application according to various example embodiments is assumed to be the camera application 611. For example, the camera application 611 may be loaded by the processor (e.g., processor 360 in FIG. 3) when an input signal for invoking a camera function is generated according to a user request or configured information. The camera application 611 may support functions, such as providing a setting menu for image sensors, providing a menu for controlling whether to store a captured video, or outputting a virtual key for shutter input. The camera application 611 may collect an input signal such as preview function invocation, capture function invocation, or video capture function invocation, and transmit it to the camera framework 660.

In an embodiment, the frameworks may include a media framework 620, an audio framework 630, a camera framework 660, and/or an audio and video synchronization manager 670.

In an embodiment, the media framework 620 may receive audio data 621 from the audio framework 630. The audio data 621 may include a plurality of audio data frames. The media framework 620 may receive video data 623 from the camera framework 660. The video data 623 may include a plurality of video data frames.

In an embodiment, the audio data 621 received from the audio framework 630 and the video data 623 received from the camera framework 660 may include timestamp information.

In an embodiment, the media framework 620 may synthesize the audio data 621 received from the audio framework 630 and the video data 623 received from the camera framework 660 (625). For example, the media framework 620 may synthesize plural audio data frames and plural video data frames based on the timestamp information (625).

In an embodiment, the audio framework 630 may include an audio recorder 631.

In an embodiment, the HAL 640 may refer to an abstracted layer between a plurality of hardware modules included in the hardware 605 and the software 603. The HAL 640 may include an event hub (not shown) that provides an interface for standardizing events occurring in input audio, a dispatcher, or a sensor.

In an embodiment, the HAL 640 may include an audio HAL 641. The audio HAL 641 may implement an interface that can access the audio device driver of the electronic device 301 and the hardware 605. The audio HAL 641 may output or receive audio through an application programming interface (API) standardized in the audio framework 630.

In an embodiment, the audio framework 630 may periodically read audio data input from the HAL 640 to the microphone device 651 (e.g., microphone 353 in FIG. 3), and may transfer the read audio data 621 to the media framework 620.

In an embodiment, when the audio input device is changed (e.g., switched) during video capture, the audio framework 630 may change the setting values of the HAL 640 in accordance with the characteristics of the switched audio input device. For example, the cases where the audio input device is switched may include a case where connection of the external electronic device 401 is detected while receiving audio data through at least one microphone of the electronic device 301, or a case where the connection of the external electronic device 401 is released while receiving audio data through the communication-connected external electronic device 401.

In an embodiment, the camera framework 660 may receive video data 623 from the camera (e.g., camera 330 in FIG. 3) and transfer it to the media framework 620.

In an embodiment, the audio and video synchronization manager 670 may include a mute data generator module (MDGM) 671, a parallel microphone device change and recording module (PMRM) 673, and a gap time measurement module (GTMM) 675.

In an embodiment, the audio and video synchronization manager 670 may be included in the application layer 610 or implemented as separate software.

In an embodiment, when the audio input device is switched during video capture, the gap time measurement module (GTMM) 675 may calculate a gap time based on the time required to complete the connection configuration of the switched audio input device. For example, the gap time measurement module (GTMM) 675 may record the start time of the operation for connection configuration of the switched audio input device and may calculate a gap time by comparing it with the time at which the operation for connection configuration is completed.

In an embodiment, when the audio input device is switched during video capture, for example, when connection of the external electronic device 401 is detected while receiving audio data through at least one microphone of the electronic device 301, the parallel microphone device change and recording module (PMRM) 673 may support receiving an audio signal through at least one microphone of the electronic device 301 for at least some of the time of performing the connection configuration of the external electronic device 401.

In an embodiment, when audio data is no longer received through at least one microphone of the electronic device 301, the gap time measurement module (GTMM) 675 may calculate a gap time based on the time point when audio data is not received through at least one microphone of the electronic device 301 and the time point when connection configuration of the external electronic device 401 is completed. The gap time measurement module (GTMM) 675, which may comprise circuitry, may store the calculated gap time.

In an embodiment, the HAL 640 may block at least one microphone of the electronic device 301 when at least some of the time of performing the connection configuration of the external electronic device 401 has elapsed.

In an embodiment, the mute data generator module (MDGM) 671 may generate mute data based on the gap time calculated by the gap time measurement module (GTMM) 675. In an embodiment, the mute data may include timestamp information. The mute data generator module (MDGM) 671 may insert the generated mute data into a queue of audio data frames based on the timestamp information.

In an embodiment, when the audio input device is switched during video capture, the HAL 640 may configure the connection of the switched audio input device based on setting values corresponding to the characteristics of the switched audio input device. For example, the setting values corresponding to the characteristics of an audio input device may include sampling rate, channel information (e.g., mono, stereo), frame count, number of microphones, and/or bit rate (e.g., 16 bits, 24 bits), supported by the external electronic device 401. However, it is not limited thereto.

Figure 7:
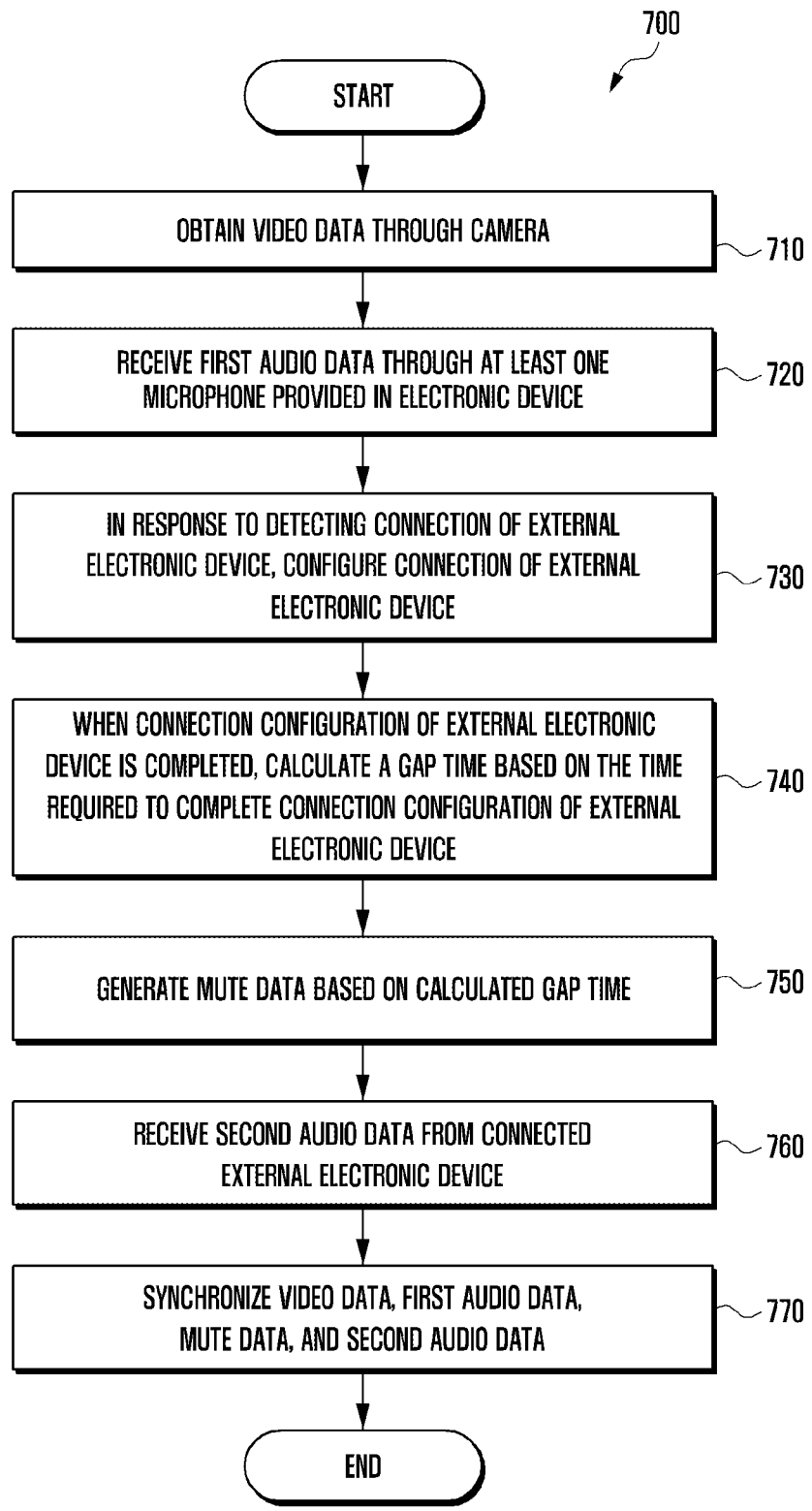
FIG. 7 is a flowchart describing a method for synthesizing video data and audio data when switching of the audio input device is detected during video capture according to various example embodiments.

FIG. 7 is a flowchart 700 describing a method for synthesizing video data and audio data when switching of the audio input device is detected during video capture according to various embodiments. The operations shown in FIG. 7 may be performed by the processor (e.g., processor 360 in FIG. 3) of the electronic device (e.g., electronic device 301 in FIG. 3).

According to various embodiments, FIG. 7 is a diagram for depicting an embodiment in which, when connection of an external electronic device (e.g., external electronic device 401 in FIG. 4) is detected while receiving first audio data through at least one microphone (e.g., first microphone 505a, second microphone 505b, and/or third microphone 505c in FIG. 5) of the electronic device (e.g., electronic device 301 in FIG. 3) during video capture, second audio data is received from the external electronic device 401. For example, the external electronic device 401 may include a wireless earphone (or, wireless headphone, wireless microphone) having at least one audio input device (e.g., at least one microphone) (e.g., wireless earphone (or, wireless headphone, wireless microphone) 530), and/or an external microphone (e.g., external microphone 504 in FIG. 5).

With reference to FIG. 7, at operation 710, the electronic device (e.g., electronic device 301 in FIG. 3) may obtain video data through a camera (e.g., camera 330 in FIG. 3).

In an embodiment, the electronic device 301 may drive the camera 330 in response to a request to execute an application related to video capture. For example, the application related to video capture may include a camera application (e.g., camera application 611 in FIG. 6) or a screen recording application. However, it is not limited thereto. The electronic device 301 may display a video collected through the camera 330 on the display (e.g., display 341 in FIG. 3) as a preview screen. Based on detection of an input requesting video capture, the electronic device 301 may obtain video data by capturing a video collected through the camera 330 from the time point when the input requesting video capture is generated. The electronic device 301 may map plural video data frames with information about the time point at which each video data frame is obtained (e.g., timestamp information) and store them.

In an embodiment, at operation 720, the electronic device 301 may receive first audio data through at least one microphone (e.g., first microphone 505a, second microphone 505b, and/or third microphone 505c) included in the electronic device 301.

In an embodiment, the electronic device 301 may store the first audio data input through at least one microphone (e.g., first microphone 505a, second microphone 505b, and/or third microphone 505c) in a buffer (e.g., audio buffer) of the memory (e.g., memory 320 in FIG. 3). For example, the first audio data may include plural first audio data frames. The electronic device 301 may map plural first audio data frames with information about the time point at which each first audio data frame is received (e.g., timestamp information) and store them.

Operations 710 and 720 according to an embodiment may be performed substantially in parallel.

In an embodiment, at operation 730, in response to detecting connection of the external electronic device 401, the electronic device 301 may configure the connection of the external electronic device 401.

In an embodiment, the electronic device 301 may check whether there is an external electronic device 401 connected through a short-range wireless communication circuit such as Bluetooth, BLE, Wi-Fi direct, UWB, or infrared data association (IrDA) (e.g., first communication 550 in FIG. 5). As another example, the electronic device 301 may check whether there is an external electronic device 401 connected to the connector (e.g., connector 515 in FIG. 5) (e.g., second communication 560 in FIG. 5). When there is an external electronic device 401 connected through the short-range wireless communication circuit or the connector 515, the electronic device 301 may determine that connection of the external electronic device 401 is detected.

In an embodiment, when connection of the external electronic device 401 is detected, the electronic device 301 may terminate the channel of at least one microphone (e.g., first microphone 505a, second microphone 505b, and/or third microphone 505c) of the electronic device 301 and initialize the setting value of the at least one microphone, through the HAL (e.g., HAL 640 in FIG. 6).

In an embodiment, after terminating the channel of at least one microphone (e.g., first microphone 505a, second microphone 505b, and/or third microphone 505c) and initializing the setting value, the electronic device 301 may perform an operation of configuring the connection of the external electronic device 401 through the HAL (e.g., HAL 640 in FIG. 6). For example, the electronic device 301 may receive information about the external electronic device 401 from the external electronic device 401. For example, the information about the external electronic device 401, as profile information on the external device 401, may include, for example, a device identifier and/or a device name. The information about the external electronic device 401 may include, but not limited to, communication protocol for receiving audio data from the external electronic device 401, sampling rate, channel information, frame count, number of microphones, and/or bit rate, supported by the external electronic device 401.

In an embodiment, at operation 740, when the connection configuration of the external electronic device 401 is completed, the electronic device 301 may calculate a gap time based on the time required to complete the connection configuration of the external electronic device 401. For example, the electronic device 301 may calculate the gap time based on the time point at which connection of the external electronic device 401 is detected and the time point at which the connection configuration of the external electronic device 401 is completed at operation 730.

According to various embodiments, the time required for the connection configuration of the external electronic device 401 being wirelessly (e.g., short-range wireless communication) or wiredly (e.g., through a connector) connected may vary according to the characteristics of the external electronic device 401. Accordingly, the gap time calculated based on the time point when connection of the external electronic device 401 is detected and the time point when the connection configuration of the external electronic device 401 is completed may be different depending on the characteristics of the external electronic device 401.

In an embodiment, upon detecting connection of the external electronic device 401, the electronic device 301 may record the start time of the operation for connection configuration of the external electronic device 401 and calculate the gap time by comparing it with the time when the operation for connection configuration is completed, through the gap time measurement module (GTMM) (e.g., GTMM 675 in FIG. 6).

In an embodiment, the electronic device 301 may determine size information of the mute data to be generated and time stamp information of the mute data based on the calculated gap time.

In an embodiment, at operation 750, the electronic device 301 may generate mute data based on the calculated gap time. For example, the mute data may include audio data of a frequency range that the user cannot perceive.

In an embodiment, the electronic device 301 may generate mute data based on the calculated gap time by using the mute data generator module (MDGM) (e.g., MDGM 671 in FIG. 6). The generated mute data may be synchronized with the video data based on time information (e.g., time stamp information) of the mute data at operation 770 to be described later.

In an embodiment, at operation 760, the electronic device 301 may receive second audio data from the connected external electronic device 401. For example, the channel of the microphone (e.g., microphone 430 in FIG. 4) of the external electronic device 401 may be opened through the connection configuration of the connected external electronic device 401, and based on this, the electronic device 301 may receive the second audio data from the external electronic device 401. The external electronic device 401 may receive second audio data through a microphone (e.g., microphone 430 in FIG. 4) and transmit it to the electronic device 301.

In an embodiment, the second audio data may include a plurality of second audio data frames. The electronic device 301 may map plural second audio data frames with information about the time point at which each second audio data frame is received (e.g., timestamp information) and store them.

In an embodiment, at operation 770, the electronic device 301 may synchronize the video data, the first audio data, the mute data, and the second audio data. For example, based on the timestamp information, the electronic device 301 may synchronize plural video data frames, plural first audio data frames included in the first audio data, the mute data, and plural second audio data frames included in the second audio data.

Figure 8:
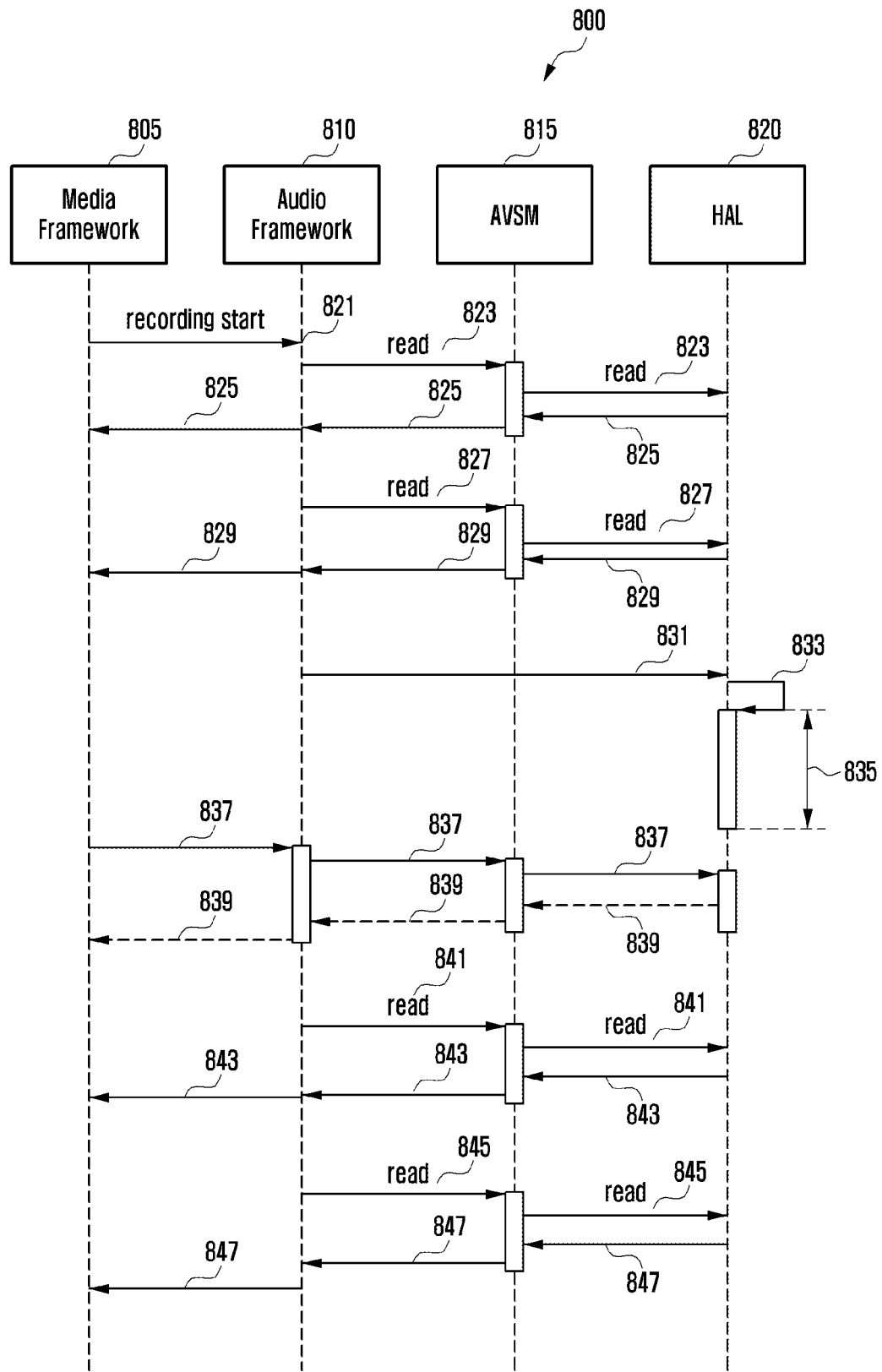
FIG. 8 is a diagram illustrating signal flows between media framework, audio framework, AVSM, and HAL for synthesizing video data and audio data when switching of the audio input device is detected during video capture according to various example embodiments.

FIG. 8 is a diagram 800 illustrating signal flows between media framework 805 (e.g., media framework 620 in FIG. 6), audio framework 810 (e.g., audio framework 630 in FIG. 6), audio and video synchronization manager (AVSM) 815 (e.g., AVSM 670 in FIG. 6), and HAL 820 (e.g., HAL 640 in FIG. 6) for synthesizing video data and audio data when switching of the audio input device is detected during video capture according to various embodiments.

According to various embodiments, FIG. 8 is a diagram for depicting an embodiment in which, when connection of an external electronic device (e.g., external electronic device 401 in FIG. 4) is detected while receiving first audio data through at least one microphone (e.g., first microphone 505*a*, second microphone 505*b*, and/or third microphone 505*c* in FIG. 5) of the electronic device (e.g., electronic device 301 in FIG. 3) during video capture, second audio data is received from the external electronic device 401.

With reference to FIG. 8, upon detecting a video capture signal, the media framework 805 may transmit a recording start signal to the audio framework 810 (821).

In an embodiment, based on the recording start signal received from the media framework 805, the audio framework 810 may transmit an audio data read signal via the AVSM 815 to the HAL 820 (823).

In an embodiment, the audio framework 810 may receive audio data read from the HAL 820 via the AVSM 815, and forward it to the media framework 805 (825). The audio data read from the HAL 820 may include audio data (e.g., first audio data) input through a microphone (e.g., first microphone 505*a*, second microphone 505*b*, and/or third microphone 505*c*) of the electronic device 301.

In an embodiment, the above-described operation of reading audio data and forwarding the read audio data to the media framework 805 may be performed at a specified time interval. For example, the audio framework 810 may transmit an audio data read signal to the HAL 820 via the AVSM 815 (827), may receive audio data read from the HAL 820 (e.g., audio data input through a microphone (e.g., first microphone 505*a*, second microphone 505*b*, and/or third microphone 505*c*) of the electronic device 301) via the AVSM 815, and may forward it to the media framework 805 (829).

In an embodiment, the electronic device 301 may detect connection of the external electronic device 401. For example, the electronic device 301 may detect connection of the external electronic device 401 through a short-range wireless communication circuit or a connector (e.g., connector 515 in FIG. 5). The audio framework 810 may transmit a signal indicating detection of connection of the external electronic device 401 to the HAL 820 (831).

In an embodiment, when connection of the external electronic device 401 is detected, the HAL 820 may terminate the channel of at least one microphone (e.g., first microphone 505*a*, second microphone 505*b*, and/or third microphone 505*c*) of the electronic device 301 and initialize the setting value of the at least one microphone.

In an embodiment, the HAL 820 may perform an operation of configuring the connection of the external electronic device 401 (833). The HAL 820 may calculate a gap time by using a gap time measurement module (GTMM) (e.g., GTMM 675 in FIG. 6) based on the time required to complete the connection configuration of the external electronic device 401, and may store it (835).

In an embodiment, the media framework 805 may transmit a signal for requesting a gap time to the HAL 820 via the audio framework 810 and the AVSM 815 (837). For example, the signal for requesting a gap time may include a request signal for information on audio data lost due to not receiving audio data while configuring the connection of the external electronic device 401 (e.g., size or time information of audio data).

In an embodiment, the HAL 820 may return the stored gap time to the media framework 805 (839).

In an embodiment, the media framework 805 may use the mute data generator module (MDGM) (e.g., MDGM 671 in FIG. 6) to generate mute data based on the gap time.

In an embodiment, the audio framework 810 may transmit an audio data read signal to the HAL 820 via the AVSM 815 (841). The audio framework 810 may receive audio data read from the HAL 820 via the AVSM 815, and transmit it to the media framework 805 (843). The audio data read from the HAL 820 may include audio data (e.g., second audio data) input through a microphone (e.g., microphone 430 in FIG. 4) of the connected external electronic device 401. For example, the channel of the microphone 430 of the external electronic device 401 may be opened due to the connection configuration of the external electronic device 401. The audio framework 810 may receive, via the AVSM 815, the second audio data input from the microphone of the external electronic device 401 through the HAL 820.

In an embodiment, the above-described operation of reading audio data and transmitting the read audio data to the media framework 805 may be performed at a specified time interval. For example, the audio framework 810 may transmit an audio data read signal to the HAL 820 via the AVSM 815 (845), may receive audio data read from the HAL 820 (e.g., audio data input through a microphone (e.g., microphone 430 in FIG. 4) of the external electronic device 401) via the AVSM 815, and may forward it to the media framework 805 (847).

Figure 9:
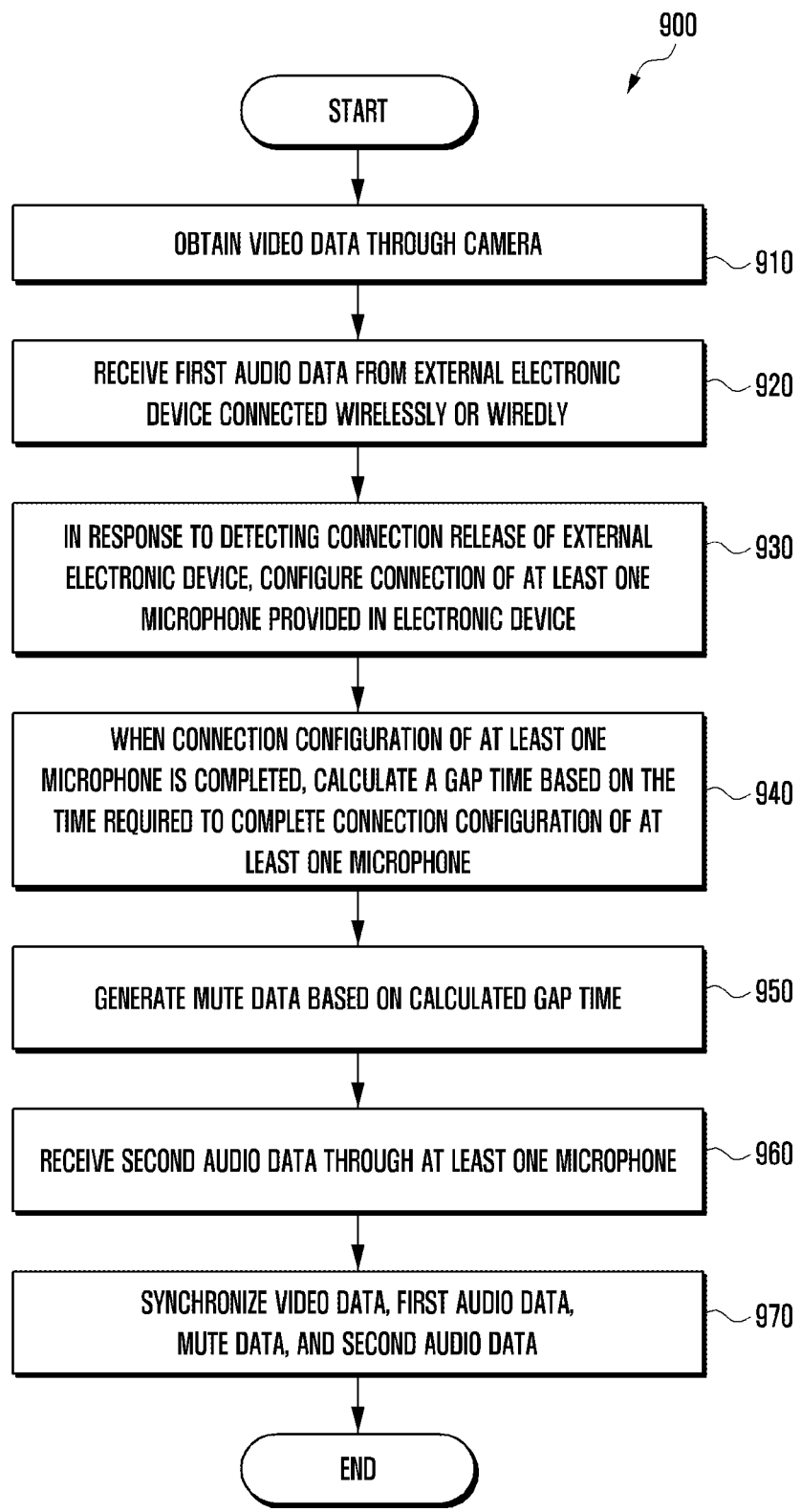
FIG. 9 is a flowchart describing a method for synthesizing video data and audio data when switching of the audio input device is detected during video capture according to various example embodiments.

FIG. 9 is a flowchart 900 describing a method for synthesizing video data and audio data when switching of the audio input device is detected during video capture according to various embodiments. The operations shown in FIG. 9 may be performed by the processor (e.g., processor 360 in FIG. 3) of the electronic device (e.g., electronic device 301 in FIG. 3).

According to various embodiments, FIG. 9 is a diagram for depicting an embodiment in which, when the connection of the external electronic device 401 wirelessly or wiredly connected is released while receiving first audio data through the external electronic device (e.g., external electronic device 401 in FIG. 4), second audio data is received through at least one microphone (e.g., first microphone 505*a*, second microphone 505*b*, and/or third microphone 505*c* in FIG. 5) of the electronic device (e.g., electronic device 301 in FIG. 3).

With reference to FIG. 9, at operation 910, the electronic device 301 may obtain video data through a camera (e.g., camera 330 in FIG. 3). For example, the electronic device 301 may obtain video data through the camera 330 in response to detecting an input for requesting video capture. The video data may include a plurality of video data frames. The electronic device 301 may map plural video data frames with information about the time point at which each video data frame is obtained (e.g., timestamp information) and store them.

In an embodiment, at operation 920, the electronic device 301 may receive first audio data from the external electronic device 401 connected wirelessly or wiredly. For example, the external electronic device 401 may include a wireless earphone (or, wireless headphone, wireless microphone) having at least one audio input device (e.g., at least one microphone) (e.g., wireless earphone (or, wireless headphone, wireless microphone) 530), and/or an external microphone (e.g., external microphone 504 in FIG. 5).

In an embodiment, the electronic device 301 may receive first audio data through the external electronic device 401 connected via a short-range wireless communication circuit (e.g., first communication 550 in FIG. 5) or through the external electronic device 401 connected to the connector (e.g., connector 515 in FIG. 5) (e.g., second communication 560 in FIG. 5). For example, the external electronic device 401 may receive first audio data through a microphone (e.g., microphone 430 of FIG. 4) and transmit it to the electronic device 301. For example, the first audio data received from the external electronic device 401 may include a plurality of first audio data frames. The electronic device 301 may map plural first audio data frames with information about the time point at which each first audio data frame is received (e.g., timestamp information) and store them.

Operations 910 and 920 according to an embodiment may be performed substantially in parallel.

In an embodiment, at operation 930, in response to detecting connection release of the external electronic device 401, the electronic device 301 may configure a connection of at least one microphone (e.g., first microphone 505a, second microphone 505b, and/or third microphone 505c) included in the electronic device 301. For example, as the connection of the external electronic device 401 is released, the electronic device 301 may switch the device for receiving audio data from the external electronic device 401 to at least one microphone of the electronic device 301.

In an embodiment, upon detecting connection release of the external electronic device 401, the electronic device 301 may terminate the channel of the microphone (e.g., microphone 430 in FIG. 4) of the external electronic device 401 and initialize the setting value of the microphone 430 of the external electronic device 401, through the HAL (e.g., HAL 640 in FIG. 6). After terminating the channel of the microphone 430 of the external electronic device 401 and initializing the setting value of the microphone 430 through the HAL 640, the electronic device 301 may configure a connection of at least one microphone (e.g., first microphone 505a, second microphone 505b, and/or third microphone 505c) included in the electronic device 301.

In an embodiment, at operation 940, when the connection configuration of at least one microphone (e.g., first microphone 505a, second microphone 505b, and/or third microphone 505c) is completed, the electronic device 301 may calculate a gap time based on the time required to complete the connection configuration of the at least one microphone (e.g., first microphone 505a, second microphone 505b, and/or third microphone 505c). For example, the electronic device 301 may calculate the gap time based on the time point at which connection release of the external electronic device 401 is detected and the time point when the connection configuration of the at least one microphone (e.g., first microphone 505a, second microphone 505b, and/or third microphone 505c) is completed at operation 930.

In an embodiment, at operation 950, the electronic device 301 may generate mute data based on the calculated gap time. For example, the electronic device 301 may generate mute data based on the calculated gap time by using the mute data generator module (MDGM) (e.g., MDGM 671 in FIG. 6). The generated mute data may include time information (e.g., timestamp information).

In an embodiment, at operation 960, the electronic device 301 may receive second audio data through the at least one microphone (e.g., first microphone 505a, second microphone 505b, and/or third microphone 505c). For example, due to connection configuration of the at least one microphone (e.g., first microphone 505a, second microphone 505b, and/or third microphone 505c), the channel of the at least one microphone may be opened, and based on this, the electronic device 301 may receive the second audio data through the at least one microphone. The second audio data may include a plurality of second audio data frames. The electronic device 301 may map plural second audio data frames with information about the time point at which each second audio data frame is received (e.g., timestamp information) and store them.

In an embodiment, at operation 970, the electronic device 301 may synchronize the video data, the first audio data, the mute data, and the second audio data. For example, based on the timestamp information, the electronic device 301 may synchronize plural video data frames, plural first audio data frames included in the first audio data, the mute data, and plural second audio data frames included in the second audio data.

Figure 10:
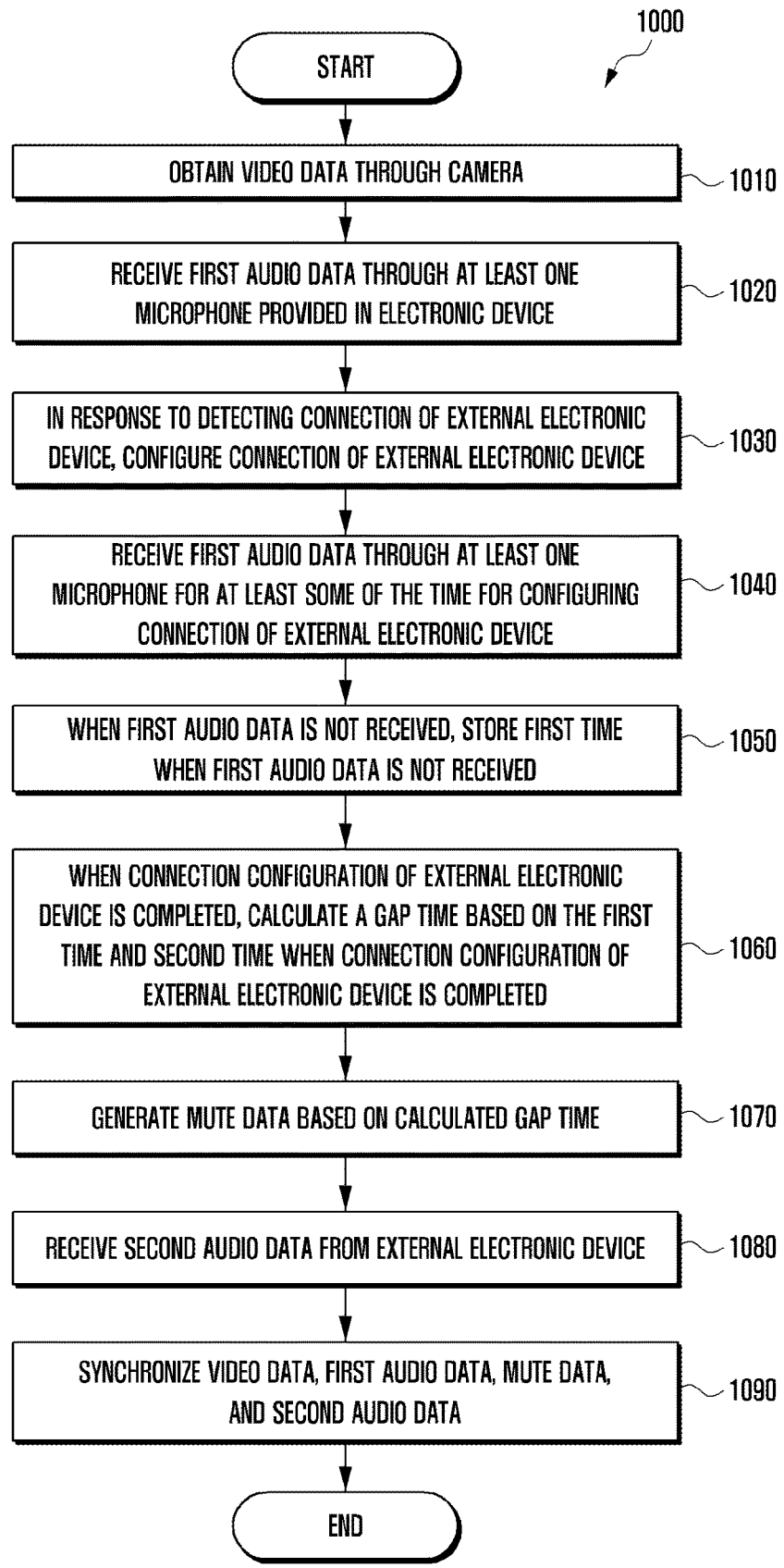
FIG. 10 is a flowchart describing a method for synthesizing video data and audio data when switching of the audio input device is detected during video capture according to various example embodiments.

FIG. 10 is a flowchart 1000 describing a method for synthesizing video data and audio data when switching of the audio input device is detected during video capture according to various embodiments. The operations shown in FIG. 10 may be performed by the processor (e.g., processor 360 in FIG. 3) of the electronic device (e.g., electronic device 301 in FIG. 3).

According to various embodiments, FIG. 10 is a diagram for depicting an embodiment in which, when an external electronic device (e.g., external electronic device 401 in FIG. 4) is connected, directly or indirectly, while receiving first audio data through at least one microphone (e.g., first microphone 505a, second microphone 505b, and/or third microphone 505c in FIG. 5) of the electronic device (e.g., electronic device 301 in FIG. 3) during video capture, second audio data is received from the external electronic device 401.

According to various embodiments, operations 1010 to 1030 and operations 1070 to 1090 of FIG. 10 are the same as operations 710 to 730 and operations 750 to 770 of FIG. 7 described above, and thus a detailed description thereof may be substituted with the corresponding description in relation to FIG. 7.

With reference to FIG. 10, at operation 1010, the electronic device (e.g., electronic device 301 in FIG. 3) may obtain video data through a camera (e.g., camera 330 in FIG. 3). At operation 1020, the electronic device 301 may receive first audio data through at least one microphone (e.g., first microphone 505a, second microphone 505b, and/or third microphone 505c) included in the electronic device 301. For instance, operations 1010 and 1020 may be performed substantially in parallel. At operation 1030, in response to detecting connection of an external electronic device 401, the electronic device 301 may configure the connection of the external electronic device 401. For example, the electronic device 301 may configure the connection of the external electronic device 401 based on setting values of the external electronic device 401. The setting values of the external electronic device 401 may include sampling rate, channel information, frame count, number of microphones, and/or bit rate, supported by the external electronic device 401.

In an embodiment, at operation 1040, the electronic device 301 may receive the first audio data through the at least one microphone (e.g., first microphone 505a, second microphone 505b, and/or third microphone 505c) for at least some of the time for configuring the connection of the external electronic device 401. For example, without terminating the channel of the at least one microphone (e.g., first microphone 505a, second microphone 505b, and/or third microphone 505c) included in the electronic device 301 for at least some of the time for configuring the connection of the external electronic device 401, the electronic device 301 may receive the first audio data through the at least one microphone (e.g., first microphone 505a, second microphone 505b, and/or third microphone 505c). In an embodiment, the electronic device 301 may use the parallel microphone device change and recording module (PMRM) (e.g., PMRM 673 in FIG. 6) to support continuously receiving the first audio signal through the at least one microphone (e.g., first microphone 505*a*, second microphone 505*b*, and/or third microphone 505*c*) of the electronic device 301 for at least some of the time during which the connection configuration of the external electronic device 401 is performed through the HAL (e.g., HAL 640 in FIG. 6 or HAL 820 in FIG. 8).

In an embodiment, when the application of the setting values of the external electronic device 401 is completed, the electronic device 301 may terminate the channel of the at least one microphone (e.g., first microphone 505*a*, second microphone 505*b*, and/or third microphone 505*c*) of the electronic device 301 and initialize the setting value of the at least one microphone (e.g., first microphone 505*a*, second microphone 505*b*, and/or third microphone 505*c*), through the HAL (e.g., HAL 640 in FIG. 6 or HAL 820 in FIG. 8).

In an embodiment, as the setting value of the at least one microphone (e.g., first microphone 505*a*, second microphone 505*b*, and/or third microphone 505*c*) is initialized, the first audio signal may be not received through the at least one microphone (e.g., first microphone 505*a*, second microphone 505*b*, and/or third microphone 505*c*). This will be described at operation 1050 below.

In an embodiment, at operation 1050, when the first audio data is not received, the electronic device 301 may store a first time when the first audio data is not received. At operation 1060, when the connection configuration of the external electronic device 401 is completed, the electronic device 301 may calculate a gap time based on the first time and a second time when the connection configuration of the external electronic device 401 is completed. For example, completion of the connection configuration of the external electronic device 401 at operation 1060 may indicate a state in which a channel of the microphone (e.g., microphone 430 in FIG. 4) of the external electronic device 401 is open so that audio data can be received through the microphone 430.

In an embodiment, when the first audio data is no longer received through the at least one microphone of the electronic device 301 while performing connection configuration of the external electronic device 401 through the HAL (e.g., HAL 640 in FIG. 6 or HAL 820 in FIG. 8), the electronic device 301 may calculate the gap time by using the gap time measurement module (GTMM) 675 based on the time point when the first audio data is not received through the at least one microphone of the electronic device 301 and the time point when the connection configuration of the external electronic device 401 is completed. The gap time measurement module (GTMM) 675 may store the calculated gap time.

According to various embodiments, the electronic device 301 can continuously receive the first audio data through the at least one microphone (e.g., first microphone 505*a*, second microphone 505*b*, and/or third microphone 505*c*) included in the electronic device 301 for at least some of the time of performing connection configuration of the external electronic device 401 at operation 1040, so that it is possible to reduce audio data lost in the process of switching the audio input device.

In an embodiment, the electronic device 301 may perform reproduction of the first audio data received through the at least one microphone (e.g., first microphone 505*a*, second microphone 505*b*, and/or third microphone 505*c*) of the electronic device 301 in parallel for at least some of the time for connection configuration of the external electronic device 401. Accordingly, it is possible to reduce audio data lost in the process of switching the audio input device.

In an embodiment, the electronic device 301 may block at least one microphone of the electronic device 301 through the HAL 640 when at least some of the time for connection configuration of the external electronic device 401 has elapsed.

In an embodiment, at operation 1070, the electronic device 301 may generate mute data based on the calculated gap time. For example, the electronic device 301 may generate mute data based on the calculated gap time by using the mute data generator module (MDGM) (e.g., MDGM 671 in FIG. 6, which may comprise circuitry). The generated mute data may include time information (e.g., timestamp information).

In an embodiment, at operation 1080, the electronic device 301 may receive second audio data from the external electronic device 401. At operation 1090, the electronic device 301 may synchronize the video data, the first audio data, the mute data, and the second audio data.

Figure 11:
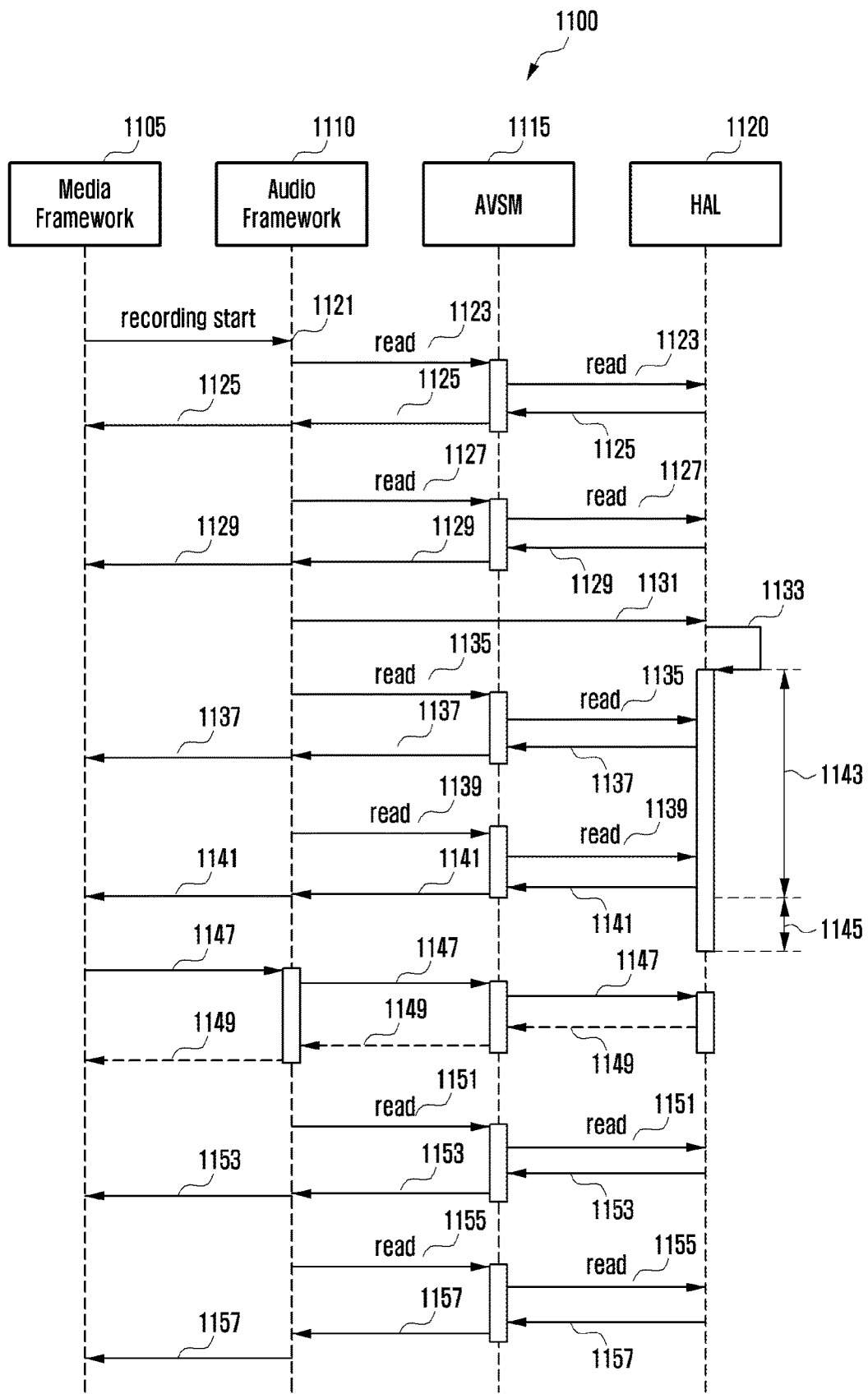
FIG. 11 is a diagram illustrating signal flows between media framework, audio framework, AVSM, and HAL for synthesizing video data and audio data when switching of the audio input device is detected during video capture according to various example embodiments.

FIG. 11 is a diagram 1100 illustrating signal flows between media framework 1105 (e.g., media framework 620 in FIG. 6), audio framework 1110 (e.g., audio framework 630 in FIG. 6), audio and video synchronization manager (AVSM) 1115 (e.g., AVSM 670 in FIG. 6), and HAL 1120 (e.g., HAL 640 in FIG. 6) for synthesizing video data and audio data when switching of the audio input device is detected during video capture according to various embodiments.

According to various embodiments, FIG. 11 is a diagram for depicting an embodiment in which, when an external electronic device (e.g., external electronic device 401 in FIG. 4) is connected while receiving first audio data through at least one microphone (e.g., first microphone 505*a*, second microphone 505*b*, and/or third microphone 505*c* in FIG. 5) of the electronic device (e.g., electronic device 301 in FIG. 3) during video capture, second audio data is received from the external electronic device 401.

According to various embodiments, operations 1121 to 1133 and operations 1151 to 1157 of FIG. 11 are the same as operations 821 to 833 and operations 841 to 847 of FIG. 8 described above, and thus a detailed description thereof may be substituted with the corresponding description in relation to FIG. 8.

With reference to FIG. 11, upon detecting a video capture signal, the media framework 1105 may transmit a recording start signal to the audio framework 1110 (1121). Based on the recording start signal received from the media framework 1105, the audio framework 1110 may transmit an audio data read signal via the AVSM 1115 to the HAL 1120 (1123, 1127). The audio framework 1110 may receive first audio data read from the HAL 1120 via the AVSM 1115, and forward it to the media framework 1105 (1125, 1129). The first audio data read from the HAL 1120 may include audio data input through a microphone (e.g., first microphone 505*a*, second microphone 505*b*, and/or third microphone 505*c*) of the electronic device 301.

In an embodiment, the electronic device 301 may detect connection of the external electronic device 401. The HAL 1120 may perform an operation of configuring the connection of the external electronic device 401 (1133). For example, the electronic device 301 may configure the connection of the external electronic device 401 based on the setting values (e.g., sampling rate, channel information, frame count, number of microphones, and/or bit rate supported by the external electronic device 401) of the external electronic device 401.

In an embodiment, the HAL 1120 may use the parallel microphone device change and recording module (PMRM) (e.g., PMRM 673 in FIG. 6) to continuously receive the first audio signal through the at least one microphone (e.g., first microphone 505*a*, second microphone 505*b*, and/or third microphone 505*c*) of the electronic device 301 for at least some of the time for performing connection configuration of the external electronic device 401 (1143). As the first audio signal is continuously received through the at least one microphone (e.g., first microphone 505*a*, second microphone 505*b*, and/or third microphone 505*c*) of the electronic device 301 for at least some of the time for performing connection configuration of the external electronic device 401, the audio framework 1110 may transmit an audio read signal to the HAL 1120 via the AVSM 1115 (1135, 1139) and may receive in response the first audio data read from the HAL 1120 via the AVSM 1115 (1137, 1141). The audio framework 1110 may forward the received first audio data to the media framework 1105 (1137, 1141).

In an embodiment, the audio framework 1110 may not receive first audio data from the HAL 1120 in response to transmitting an audio data read signal to the HAL 1120 via the AVSM 1115. For example, when the application of the setting values of the external electronic device 401 is completed, the HAL 1120 may terminate the channel of the at least one microphone (e.g., first microphone 505*a*, second microphone 505*b*, and/or third microphone 505*c*) of the electronic device 301 and may initialize the setting value of the at least one microphone. As the channel of the at least one microphone is terminated and the setting value of the at least one microphone is initialized by the HAL 1120, the audio framework 1110 may not receive first audio data from the HAL 1120.

In an embodiment, the HAL 1120 may use the gap time measurement module (GTMM) (e.g., GTMM 675 in FIG. 6, which may comprise circuitry) to calculate a gap time based on a first time when the first audio data is not received (e.g., first time when the first audio data is not received as the channel of the at least one microphone is terminated and the setting value thereof is initialized) and a second time when the connection configuration of the external electronic device 401 is completed (e.g., second time when second audio data can be received through the microphone 430 by opening a channel of the microphone (e.g., microphone 430 in FIG. 4) of the external electronic device 401) and store the gap time (1145).

In an embodiment, the media framework 1105 may transmit a signal for requesting a gap time to the HAL 1120 via the audio framework 1110 and the AVSM 1115 (1147). For example, the signal for requesting a gap time may include a request signal for information about lost audio data (e.g., size or time information of audio data) due to not receiving audio data while configuring the connection of the external electronic device 401. The HAL 1120 may return the stored gap time to the media framework 1105 (1149).

In an embodiment, the media framework 1105 may generate mute data based on the gap time by using the mute data generator module (MDGM) (e.g., MDGM 671 in FIG. 6, which may comprise circuitry).

In an embodiment, the audio framework 1110 may transmit an audio data read signal to the HAL 1120 via the AVSM 1115 (1151, 1155). The audio framework 1110 may receive second audio data read from the HAL 1120 via the AVSM 1115 and forward it to the media framework 1105 (1153, 1157). The second audio data read from the HAL 1120 may include audio data input through a microphone (e.g., microphone 430 in FIG. 4) of the connected external electronic device 401.

Figure 12:
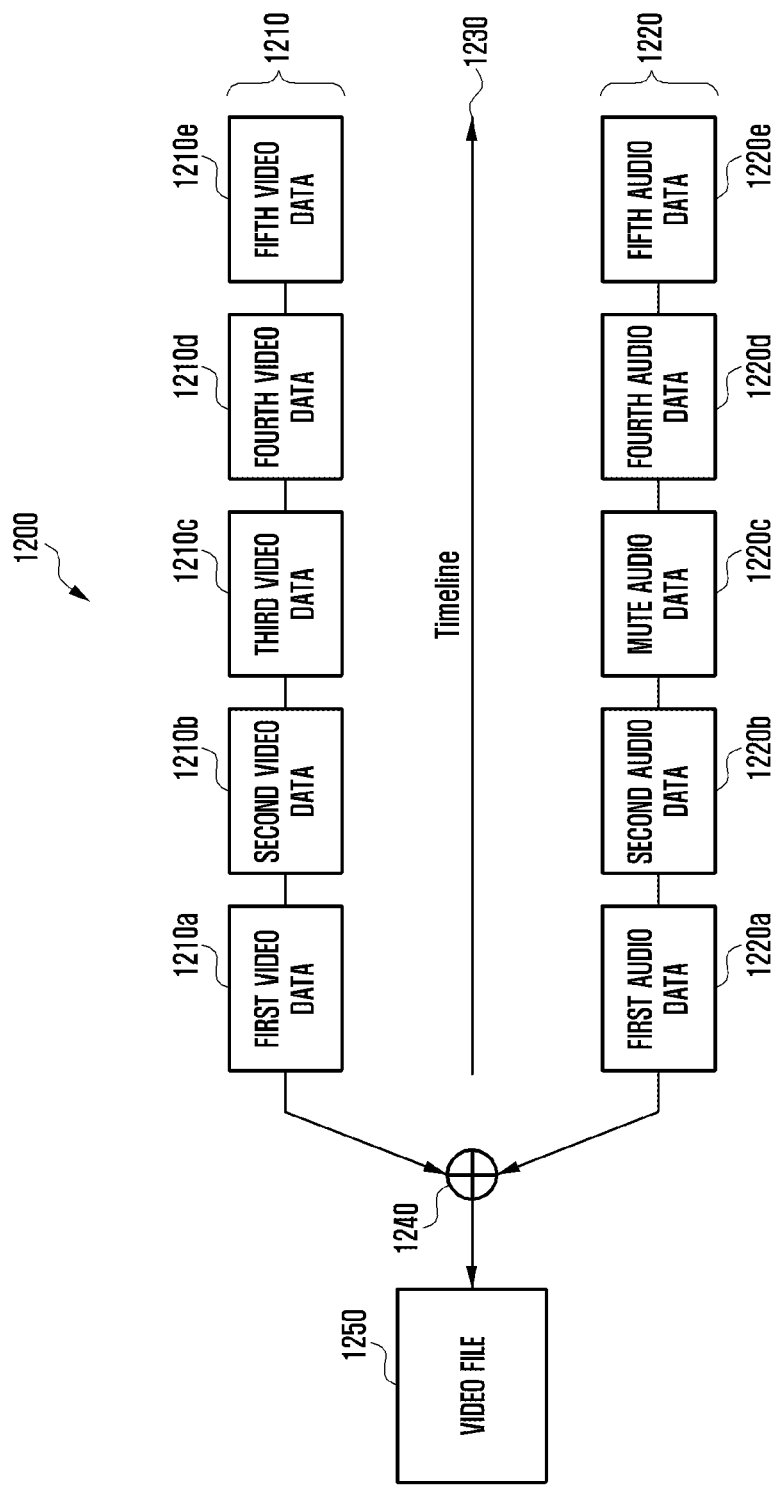
FIG. 12 is a diagram describing a method for synchronizing video data and audio data when switching of the audio input device is detected during video capture according to various example embodiments.

FIG. 12 is a diagram 1200 describing a method for synchronizing video data and audio data when switching of the audio input device is detected during video capture according to various embodiments.

According to various embodiments, it may include both the above-described embodiment of FIG. 7 in which, as an external electronic device (e.g., external electronic device 401 in FIG. 4) is connected while receiving audio data through at least one microphone (e.g., first microphone 505*a*, second microphone 505*b*, and/or third microphone 505*c* in FIG. 5) of the electronic device (e.g., electronic device 301 in FIG. 3) during video capture, audio data is received through a microphone (e.g., microphone 430 in FIG. 4) of the external electronic device 401, and the above-described embodiment of FIG. 9 in which, as the connection of the external electronic device 401 is released while receiving audio data through the external electronic device being wirelessly or wiredly connected, audio data is received through at least one microphone (e.g., first microphone 505*a*, second microphone 505*b*, and/or third microphone 505*c*) of the electronic device 301.

With reference to FIG. 12, the electronic device 301 may obtain video data through a camera (e.g., camera 330 in FIG. 3) in response to detecting an input for requesting video capture. For example, the video data may include a plurality of video data frames 1210 (e.g., first video data 1210*a*, second video data 1210*b*, third video data 1210*c*, fourth video data 1210*d*, and/or fifth video data 1210*e*). The electronic device 301 may map plural video data frames 1210 with information about the time point at which each of the video data frames 1210 is obtained (e.g., timestamp information) (1230) and store them. In an embodiment, the obtained plural video data frames 1210 may be sequentially inserted into a queue of video frames based on the time information.

In an embodiment, the electronic device 301 may receive audio data through at least one microphone (e.g., first microphone 505*a*, second microphone 505*b*, and/or third microphone 505*c* in FIG. 5) included in the electronic device 301. Alternatively, the electronic device 301 may receive audio data from an external electronic device 401 connected wirelessly or wiredly. For example, the audio data received from the external electronic device 401 may include a plurality of audio data frames (e.g., first audio data 1220*a*, second audio data 1220*b*). The electronic device 301 may map plural audio data frames with information about the time point at which each audio data frame is received (e.g., time stamp information) (1230) and store them. In an embodiment, plural audio data frames of the audio data received from the external electronic device 401 may be sequentially inserted into a queue of audio data frames based on the time information 1230.

The operation of obtaining video data and the operation of receiving audio data described above may be performed substantially in parallel.

In an embodiment, the electronic device 301 may detect switching of the device for receiving audio data. For example, connection of an external electronic device 401 may be detected while receiving audio data through at least one microphone (e.g., first microphone 505*a*, second microphone 505*b*, and/or third microphone 505*c* in FIG. 5) included in the electronic device 301. Or, while receiving audio data from the external electronic device 401 being connected wirelessly or wiredly, the electronic device 301 may detect release of the connection of the external electronic device 401.

In an embodiment, the electronic device 301 may configure the connection of the switched audio input device to receive audio data from the switched audio input device. The electronic device 301 cannot receive audio data while configuring the connection of the switched audio input device. As a result, there may be lost audio data.

According to various example embodiments, when the connection configuration of the switched audio input device is completed, the electronic device 301 may calculate a gap time based on the time required to complete the connection configuration of the switched audio input device. The electronic device 301 may generate mute data 1220c based on the calculated gap time. For example, the electronic device 301 may insert the generated mute data 1220c into the queue of audio data frames based on the timestamp information 1230.

In an embodiment, audio data may be received from the audio input device whose connection is completed. For example, audio data received from the connected audio input device may include a plurality of audio data frames (e.g., fourth audio data 1220d and fifth audio data 1220e). In an embodiment, plural audio data frames of the audio data received from the connected audio input device may be sequentially inserted into the queue of audio data frames based on the time information.

In an embodiment, based on the time information (e.g., timestamp information) 1230, the electronic device 301 may sequentially synthesize (e.g., synchronize) the first video data 1210a, the second video data 1210b, the third video data 1210c, the fourth video data 1210d, and the fifth video data 1210e, which are stored, respectively, with the first audio data 1220a, the second audio data 1220b, the mute data 1220c, the fourth audio data 1220d, and the fifth audio data 1220e, which are stored (1240). As a result of the synthesis (e.g., synchronization) 1240, the electronic device 301 may generate a video file 1250 in a form that the user can use.

Figure 13:
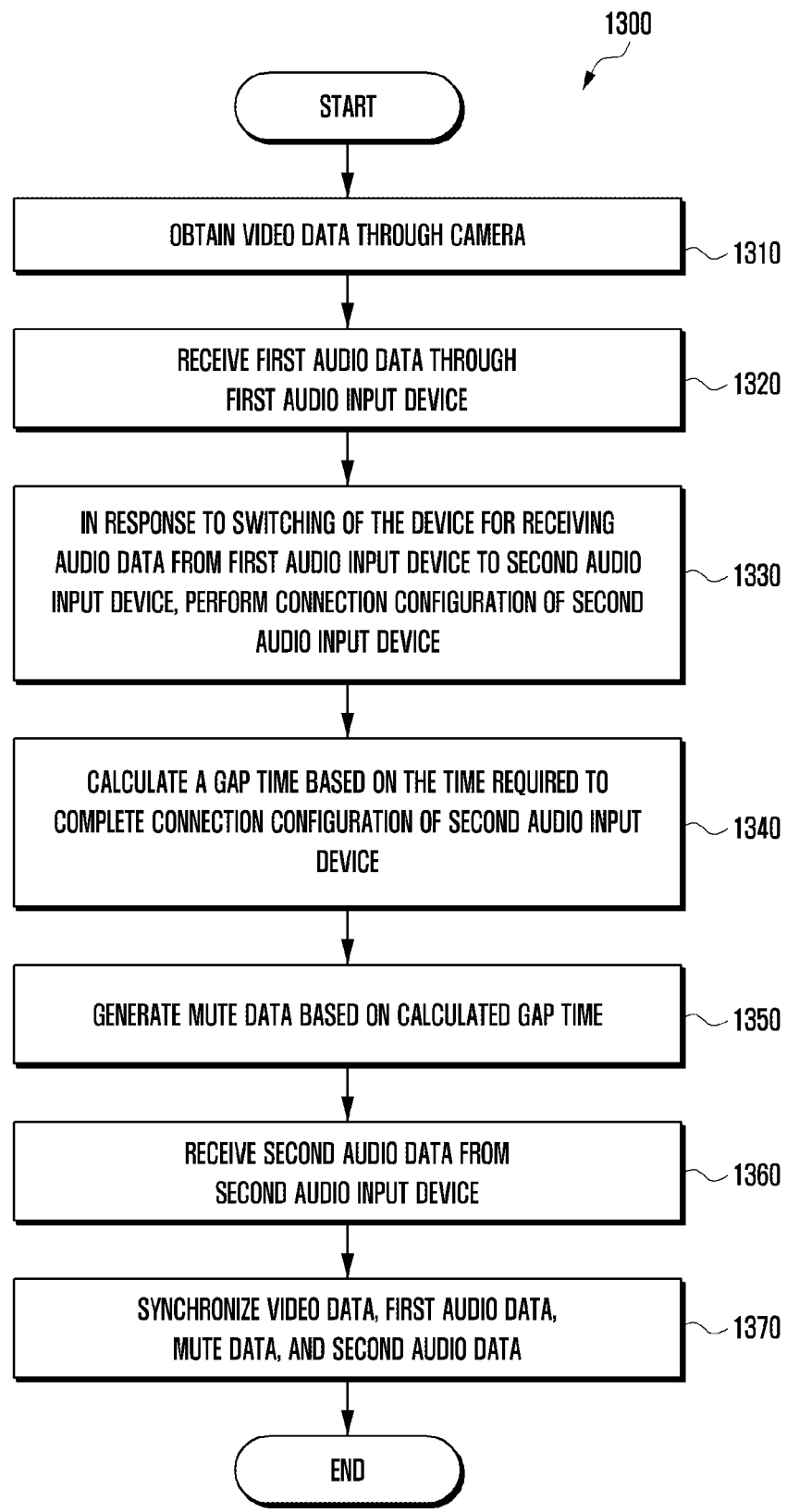
FIG. 13 is a flowchart describing a method for synchronizing video data and audio data when switching of the audio input device is detected during video capture according to various example embodiments.

FIG. 13 is a flowchart 1300 describing a method for synchronizing video data and audio data when switching of the audio input device is detected during video capture according to various embodiments.

With reference to FIG. 13, at operation 1310, the electronic device (e.g., electronic device 301 in FIG. 3) may obtain video data through a camera (e.g., camera 330 in FIG. 3). For example, based on detection of an input requesting video capture, the electronic device 301 may obtain video data by capturing a video collected through the camera 330 from the time point when the input requesting video capture is generated.

In an embodiment, at operation 1320, the electronic device 301 may receive first audio data through a first audio input device. For example, the first audio input device may include at least one microphone (e.g., first microphone 505a, second microphone 505b, and/or third microphone 505c in FIG. 5) included in the electronic device 301, or an audio device (e.g., wireless earphone (wireless headphone, wireless microphone) or external microphone) having at least one microphone and connected, directly or indirectly, through a communication circuit (e.g., short-range wireless communication circuit) and/or a connector (e.g., connector 515 in FIG. 5, comprising circuitry) of the electronic device 301.

In an embodiment, at operation 1330, in response to switching of the device for receiving audio data from the first audio input device to a second audio input device, the electronic device 301 may perform connection configuration of the second audio input device. For example, the operation of switching from the first audio input device to the second audio input device may include an operation at which, while the first audio data is being received through at least one microphone (e.g., first microphone 505a, second microphone 505b, and/or third microphone 505c) of the electronic device 301, when connection of an external electronic device (e.g., external electronic device 401 of FIG. 4), for example, an audio device having at least one microphone, is detected, the device for receiving audio data is switched from the at least one microphone to the audio equipment. As another example, the operation of switching from the first audio input device to the second audio input device may include an operation at which, while the first audio data is being received through an external electronic device 401 connected wirelessly or wiredly, for example, an audio device having at least one microphone, when the connection of the audio device having at least one microphone is released, the device for receiving audio data is switched from the audio device to at least one microphone of the electronic device 301. The electronic device 301 may perform an operation of configuring the connection of the second audio input device (e.g., switched audio device or at least one microphone of the electronic device 301) so that audio data can be received through the second audio input device (e.g., switched audio device or at least one microphone of the electronic device 301).

In an embodiment, at operation 1340, the electronic device 301 may calculate a gap time based on the time required to complete the connection configuration of the second audio input device. For example, through the gap time measurement module (GTMM) (e.g., GTMM 675 in FIG. 6), the electronic device 301 may calculate the gap time by recording the start time of the operation of configuring the connection of the second audio input device and comparing it with the time at which the operation of configuring the connection is completed.

In an embodiment, at operation 1350, the electronic device 301 may generate mute data based on the calculated gap time. For example, the electronic device 301 may generate mute data based on the calculated gap time by using the mute data generator module (MDGM) (e.g., MDGM 671 in FIG. 6).

In an embodiment, the electronic device 301 may receive second audio data from the second audio input device at operation 1360, and may synchronize the video data, the first audio data, the mute data, and the second audio data at operation 1370. For example, the electronic device 301 may synchronize the video data, the first audio data, the mute data, and the second audio data based on the timestamp information recorded in each of the video data, the first audio data, the mute data, and the second audio data.

According to various embodiments, when switching of the audio input device is detected during video capture, it is possible to synchronize the video data obtained from the camera, the first audio data received through a microphone before switching, the mute data generated based on the gap time, and the second audio data received through a switched microphone. By inserting generated mute data in a section in which audio data is not received in the process of configuring the switched microphone as a microphone for receiving audio data, the synchronization between the video data and the audio data may be matched. Accordingly, even when switching of the audio input device is detected during video capture, the electronic device 301 can continuously receive audio data through the switched audio input device.

According to various embodiments, a method for the electronic device 301 to synchronize video data and audio data may include: obtaining video data through a camera 330; receiving first audio data through a first audio input device; configuring, when the device for receiving audio data is switched from the first audio input device to a second audio input device, the connection of the second audio input device; calculating a gap time based on the time required to complete the connection configuration of the second audio input device; generating mute data based on the calculated gap time; receiving second audio data from the second audio input device; and synchronizing the video data, the first audio data, the mute data, and the second audio data. "Based on" as used herein covers based at least on.

According to various embodiments, the first audio input device may include at least one microphone (e.g., first microphone 505a, second microphone 505b, and/or third microphone 505c) included in the electronic device 301, and the second audio input device may include an audio device having at least one microphone and connected, directly or indirectly, through a communication circuit 310 and/or connector 515 of the electronic device 301.

According to various embodiments, the method for the electronic device 301 to synchronize video data and audio data may further include receiving the first audio data through the first audio input device for at least some of the time for the connection configuration of the second audio input device.

According to various embodiments, calculating a gap time may include calculating, when the first audio data is not received through the first audio input device, the gap time based on the time taken to complete the connection configuration of the second audio input device from a point in time when the second audio data is not received.

According to various embodiments, the method for the electronic device 301 to synchronize video data and audio data may further include blocking the first audio input device in response to completing the connection configuration of the second audio input device.

According to various embodiments, the first audio input device may include an external microphone connected through a communication circuit 310 or connector 515 of the electronic device 301, and the second audio input device may include at least one microphone (e.g., first microphone 505a, second microphone 505b, and/or third microphone 505c) included in the electronic device 301.

According to various embodiments, the method for the electronic device 301 to synchronize video data and audio data may further include determining size information and timestamp information of the mute data to be generated based on the calculated gap time.

According to various embodiments, the video data may include plural video frames, the first audio data and the second audio data may each include plural audio data frames, and the plural video frames, the mute data, and the plural audio data frames may each be set to have timestamp information.

According to various embodiments, synchronizing the video data, the first audio data, the mute data, and the second audio data may include synchronizing the plural video frames, the mute data, and the plural audio data frames on the basis of the timestamps.

According to various embodiments, the mute data may include audio data of a frequency range that a user cannot perceive.

According to the above-described embodiments of FIGS. 6 to 13, even when switching of the audio input device is detected during video capture, audio data can be continuously received through the switched audio input device, so that it is possible to easily switch between the first audio input device and the second audio input device during video capture.

According to various embodiments, as the audio input device can be easily switched and used during video capture, it may also be possible to implement a scenario in which audio data (e.g., voice) of a distant speaker is acquired by using a first audio input device (e.g., audio device connected wirelessly or wiredly) and audio data (e.g., voice) of a user taking a video is obtained by using a second audio input device (e.g., at least one microphone of the electronic device 301).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various example embodiments and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., through wires), wirelessly, or via at least a third element.

As used in connection with various example embodiments, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
   a camera; and
   a processor operably connected to the camera,
   wherein the processor is configured to:
   obtain video data via at least the camera,
   receive first audio data via at least a first audio input device comprising a microphone,
   configure a connection for a second audio input device comprising a microphone, based on a device for receiving audio data being switched from the first audio input device to the second audio input device,
   calculate a gap time based on a time required to complete connection configuration of the second audio input device,
   generate mute data based on the calculated gap time,
   receive second audio data from the second audio input device, and
   synchronize the video data, the first audio data, the mute data, and the second audio data.

2. The electronic device of claim 1, further comprising:
   a communication circuit; and
   a connector,
   wherein the first audio input device includes at least one microphone included in the electronic device, and
   wherein the second audio input device includes an audio device having at least one microphone and to be connected through the communication circuit and/or the connector.

3. The electronic device of claim 2, wherein the processor is further configured to:
   receive the first audio data via at least the first audio input device for at least some of a time of the connection configuration of the second audio input device, and
   calculate, based on the first audio data not received through the first audio input device, the gap time based on the time taken to complete the connection configuration of the second audio input device from a determined point in time when the second audio data is not received.

4. The electronic device of claim 3, wherein the processor is further configured to:
   block the first audio input device in response to completing the connection configuration of the second audio input device.

5. The electronic device of claim 1, further comprising:
   a communication circuit; and
   a connector,
   wherein the first audio input device includes an external microphone to be connected through the communication circuit and/or the connector, and
   wherein the second audio input device includes at least one microphone included in the electronic device.

6. The electronic device of claim 1, wherein the processor is further configured to:
   determine size information and timestamp information of the mute data to be generated based on the calculated gap time.

7. The electronic device of claim 1,
   wherein the video data includes plural video frames,
   wherein each of the first audio data and the second audio data includes plural audio data frames,
   wherein the plural video frames, the mute data, and the plural audio data frames are each set to comprise timestamp information, and
   wherein the processor is further configured to:
   synchronize the plural video frames, the mute data, and the plural audio data frames based on timestamps.

8. The electronic device of claim 1, wherein the mute data includes audio data of a frequency range that a user cannot perceive.

9. A method for synchronize video data and audio data of an electronic device, the method comprising:

obtaining video data through at least a camera;
receiving first audio data through at least a first audio input device;
configuring a connection of the second audio input device, based on a device for receiving audio data being switched from the first audio input device to a second audio input device;
calculating a gap time based on a time required to complete the connection configuration of the second audio input device;
generating mute data based on the calculated gap time;
receiving second audio data from the second audio input device; and
synchronizing the video data, the first audio data, the mute data, and the second audio data.

10. The method of claim 9,
wherein the first audio input device includes at least one microphone included in the electronic device, and
wherein the second audio input device includes an audio device comprising at least one microphone and connected via at least a communication circuit and/or a connector of the electronic device.

11. The method of claim 10, further comprising:
receiving the first audio data through the first audio input device for at least some of a time for the connection configuration of the second audio input device,
wherein calculating the gap time comprises:
calculating, based on the first audio data not received through the first audio input device, the gap time based on the time taken to complete the connection configuration of the second audio input device from a determined point in time when the second audio data is not received.

12. The method of claim 11, further comprising:
blocking the first audio input device in response to completing the connection configuration of the second audio input device.

13. The method of claim 9,
wherein the first audio input device includes an external microphone connected via at least a communication circuit and/or a connector of the electronic device, and
wherein the second audio input device includes at least one microphone included in the electronic device.

14. The method of claim 9, further comprising:
determining size information and timestamp information of the mute data to be generated based on the calculated gap time.

15. The method of claim 9,
wherein the video data includes plural video frames;
wherein each of the first audio data and the second audio data includes plural audio data frames;
wherein the plural video frames, the mute data, and the plural audio data frames are each set to comprise timestamp information; and
wherein synchronizing the video data, the first audio data, the mute data, and the second audio data comprises:
synchronizing the plural video frames, the mute data, and the plural audio data frames based on timestamps.

* * * * *